US010972888B2

(12) United States Patent
Best

(10) Patent No.: US 10,972,888 B2
(45) Date of Patent: Apr. 6, 2021

(54) IOT DEVICES BASED MESSAGING SYSTEMS AND METHODS

(71) Applicant: Best Network Systems Inc., Miami Beach, FL (US)

(72) Inventor: Jules Best, Berkeley, CA (US)

(73) Assignee: Best Network Systems Inc., Miami Beach, FL (US)

( * ) Notice: Subject to any disclaimer, the term of this patent is extended or adjusted under 35 U.S.C. 154(b) by 0 days.

(21) Appl. No.: 16/578,138

(22) Filed: Sep. 20, 2019

(65) Prior Publication Data

US 2020/0037139 A1     Jan. 30, 2020

Related U.S. Application Data

(63) Continuation of application No. 16/215,353, filed on Dec. 10, 2018, now Pat. No. 10,433,140.
(Continued)

(51) Int. Cl.
*H04W 4/80*     (2018.01)
*H04L 29/08*     (2006.01)
(Continued)

(52) U.S. Cl.
CPC ............. *H04W 4/80* (2018.02); *H04L 67/12* (2013.01); *H04L 67/16* (2013.01); *H04L 67/26* (2013.01); *H04W 4/70* (2018.02); *H04W 8/005* (2013.01)

(58) Field of Classification Search
CPC ........ H04W 4/80; H04W 8/005; H04L 67/12; H04L 67/26; H04L 67/16
See application file for complete search history.

(56) References Cited

U.S. PATENT DOCUMENTS 8,755,824 B1 *   6/2014   Wang ................... H04W 4/021
                                                 455/456.3
9,635,118 B1 *   4/2017   DeLuca ................. H04L 67/26
(Continued)

FOREIGN PATENT DOCUMENTS

WO     WO2019118503 A1     6/2019

OTHER PUBLICATIONS

"International Search Report" and "Written Opinion of the International Searching Authority," Patent Cooperation Treaty Application No. PCT/US2018/065013, dated Mar. 4, 2019, 15 pages.
(Continued)

*Primary Examiner* — Lewis G West
(74) *Attorney, Agent, or Firm* — Carr & Ferrell LLP

(57) ABSTRACT

IOT device-based messaging communications systems and methods are disclosed herein. An example system includes an Internet-of-things backend system comprising IOT devices that implement proximity and physical web discovery services and implement a modified short-range wireless communication protocol stack for communicating with communication devices at a kernel level; and each of the communication devices being configured to with receive messages from the Internet-of-things backend system over a short-range wireless connection, the messages are presented to the communication devices without an application being installed on the communication devices, the modified short-range wireless communication protocol stack being configured based on a short-range wireless protocol that is active on the each of the communication devices.

34 Claims, 11 Drawing Sheets

Related U.S. Application Data

(60) Provisional application No. 62/597,660, filed on Dec. 12, 2017.

(51) Int. Cl.
*H04W 8/00* (2009.01)
*H04W 4/70* (2018.01)

(56) References Cited

U.S. PATENT DOCUMENTS

| | | | |
|---|---|---|---|
| 10,212,174 B2* | 2/2019 | Muddu | G06F 3/0484 |
| 10,433,140 B2 | 10/2019 | Best | |
| 10,475,066 B1 | 11/2019 | Kakani et al. | |
| 10,506,367 B2 | 12/2019 | Best | |
| 10,567,907 B2 | 2/2020 | Best | |
| 10,757,534 B2 | 8/2020 | Best | |
| 2004/0140361 A1 | 7/2004 | Paul et al. | |
| 2009/0076966 A1* | 3/2009 | Bishop | G06Q 20/027 |
| | | | 705/67 |
| 2009/0131079 A1 | 5/2009 | Sekhar | |
| 2009/0264070 A1* | 10/2009 | Lim | G06Q 30/0261 |
| | | | 455/41.2 |
| 2011/0282724 A1 | 11/2011 | Hwang | |
| 2012/0101952 A1* | 4/2012 | Raleigh | G06Q 30/016 |
| | | | 705/304 |
| 2012/0110618 A1 | 5/2012 | Kilar et al. | |
| 2012/0215896 A1 | 8/2012 | Johannsen | |
| 2012/0316940 A1* | 12/2012 | Moshfeghi | G06Q 30/02 |
| | | | 705/14.16 |
| 2014/0067828 A1 | 3/2014 | Archibong et al. | |
| 2014/0087712 A1* | 3/2014 | Danford | H04L 41/0893 |
| | | | 455/419 |
| 2014/0335897 A1 | 11/2014 | Clem et al. | |
| 2014/0351418 A1 | 11/2014 | Toubiana et al. | |
| 2014/0365304 A1 | 12/2014 | Showers et al. | |
| 2015/0215781 A1 | 7/2015 | Reed et al. | |
| 2015/0248702 A1 | 9/2015 | Chatterton | |
| 2015/0264051 A1 | 9/2015 | Hoggan | |
| 2015/0324851 A1 | 11/2015 | Campbell et al. | |
| 2016/0088443 A1 | 3/2016 | Kostka et al. | |
| 2016/0180393 A1 | 6/2016 | Mulye | |
| 2016/0182524 A1* | 6/2016 | Khosravi | H04L 63/105 |
| | | | 726/1 |
| 2016/0259932 A1* | 9/2016 | Lakshmanan | H04W 4/029 |
| 2016/0285903 A1* | 9/2016 | Hinchliffe | H04L 63/1425 |
| 2016/0337049 A1 | 11/2016 | Dhakal et al. | |
| 2016/0342906 A1* | 11/2016 | Shaashua | H04L 67/22 |
| 2017/0161749 A1 | 6/2017 | Shaikh | |
| 2017/0180046 A1 | 6/2017 | Stout et al. | |
| 2018/0063684 A1 | 3/2018 | Cheng et al. | |
| 2018/0101834 A1 | 4/2018 | Laracey | |
| 2018/0176203 A1 | 6/2018 | Wang | |
| 2018/0248850 A1* | 8/2018 | Tee | H04L 61/2503 |
| 2018/0330348 A1* | 11/2018 | Uhr | G06Q 20/3678 |
| 2018/0351761 A1* | 12/2018 | Li | H04L 12/281 |
| 2018/0367946 A1* | 12/2018 | Best | H04W 4/70 |
| 2018/0368819 A1* | 12/2018 | Gogineni | A61B 5/00 |
| 2019/0020637 A1* | 1/2019 | Andersen | H04L 63/0485 |
| 2019/0052659 A1* | 2/2019 | Weingarten | H04L 63/104 |
| 2019/0182649 A1 | 6/2019 | Best | |
| 2019/0253834 A1 | 8/2019 | Best | |
| 2019/0268717 A1 | 8/2019 | Best | |
| 2020/0107158 A1 | 4/2020 | Best | |

OTHER PUBLICATIONS

Jeon et al., "BLE Beacons for Internet-of-Things Applications: Survey, Challenges and Opportunities," Social Media Lab, the Department of Electrical and Computer Engineering, The Hong Kong University of Science and Technology [online], Nov. 20, 2017 [retrieved on Feb. 4, 2019], Retrieved from the Internet: <URL:http://smedia.ust.hk/luxbeacon/resources/Jeon%20et#20al%20-%202018%20IOTJ.pdf>, pp. 1-18.

"Application," The American Heritage Dictionary of the English Language [online], 2019 [retrieved Jun. 12, 2019], Retrieved from the Internet: <URL:https://ahdictionary.com/word/search.html?q=application>, 1 page.

"Apple Wallet," Wikipedia [online], May 20, 2019 [retrieved Jun. 13, 2019], Retrieved from the Internet: <URL:https://en.wikipedia.org/wiki/Apple_Wallet>, 3 pages.

* cited by examiner

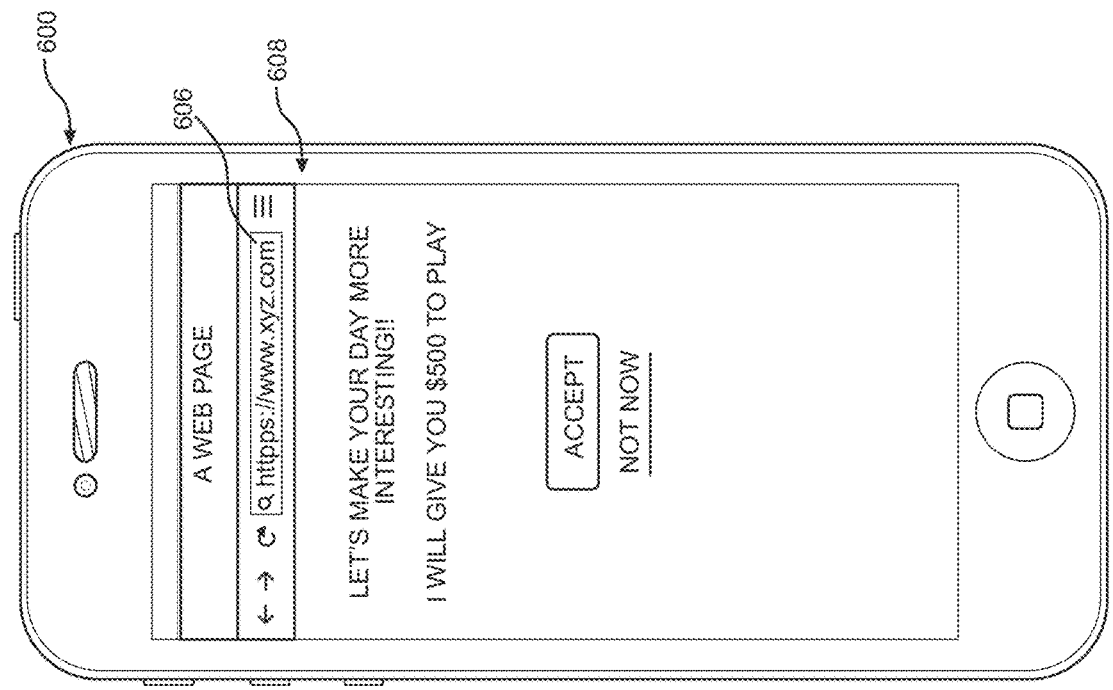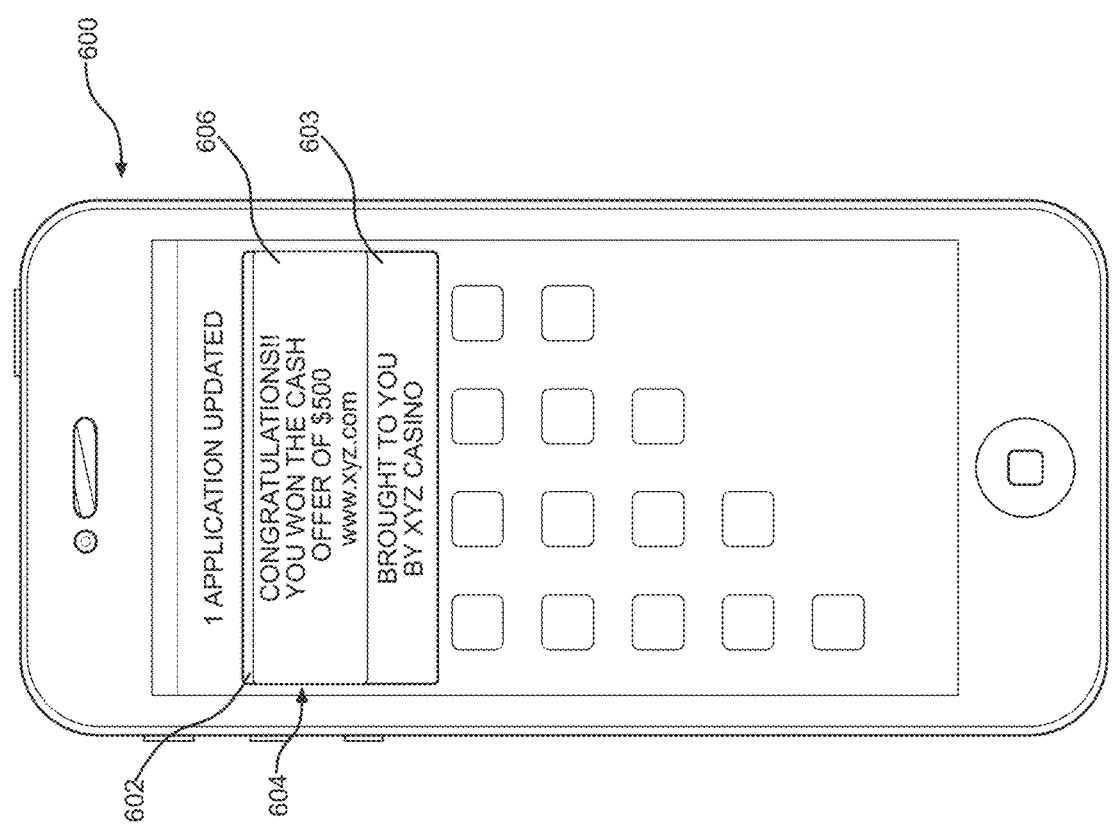
FIG. 6

IOT DEVICES BASED MESSAGING SYSTEMS AND METHODS

CROSS REFERENCE TO RELATED APPLICATIONS

This non-provisional application is a continuation of U.S. application Ser. No. 16/215,353, filed on Dec. 10, 2018, titled "IOT DEVICES BASED MESSAGING SYSTEMS AND METHODS", which claims the benefit and priority of U.S. Provisional Application No. 62/597,660, filed on Dec. 12, 2017, titled "IOT Devices Based Messaging Systems and Methods Using Nearby Proximity Solutions", each of these is hereby incorporated by reference herein in their entireties including all references and appendices cited therein, for all purposes.

FIELD

The present disclosure is related generally to messaging architectures, and more specifically, but not by limitation to systems and methods that allow for messaging using a distributed architecture (such as Internet-of-Things "IOT"), where end point devices (user equipment "UE") can transmit and receive notifications and content within the distributed architecture without having to install an application to enable the such messaging and content delivery services. Some embodiments include the use of Bluetooth log files and/or kernel level communication.

SUMMARY

According to some embodiments, the present disclosure is directed to a system for application-less communication, the system comprising an Internet-of-things backend system comprising IOT devices that implement proximity and physical web discovery services and implement a modified short-range wireless communication protocol stack for communicating with communication devices at a kernel level; and each of the communication devices receiving messages from the Internet-of-things backend system over a short-range wireless connection, the messages are presented to the communication devices without an application being installed on the communication devices, the modified short-range wireless communication protocol stack being configured based on a short-range wireless protocol that is active on the each of the communication devices.

In some embodiments, the systems and methods herein deliver IOT engagement notification information such as text, photos, sounds, and the like. In some use cases IOT engagement notifications are facilitated through communication with device kernel level components such as print, phone, camera, flashlight, and sound—just to name a few.

According to some embodiments, the present disclosure is directed to a method comprising communicating with a communication device over a short-range wireless connection using a modified short-range wireless communication protocol stack implemented by an Internet-of-things (IOT) device of an Internet-of-things backend system; configuring the protocol stack based on a short-range wireless protocol that is active on the communication device; reading, by an IOT device of the Internet-of-things backend system, a low-level protocol log file stored on the communication device when the communication device is in short-range wireless communication proximity to the IOT device; and transmitting a message to the communication device using the short-range wireless protocol, wherein the message can be displayed on the communication device without an application being installed on the communication device, wherein the message has content that is based on the low-level protocol log file.

Again, IOT engagement notifications messages are capable being provided at the device kernel level services of a communication device. Messaging use cases send information for presentation on the communication device and the message can function at a kernel level service of the communication device.

According to some embodiments, the present disclosure is directed to a method comprising establishing a short-range wireless connection between an Internet-of-things (IOT) device and a communication device, configuring a protocol stack of the IOT device based on a short-range wireless protocol that is active on the communication device, and configuring a message for presentation on the communication device, wherein the message is presented using a kernel level service of the communication device.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 6 illustrates notifications and corresponding content displayed on a communication device in accordance with embodiments of the present disclosure.

DETAILED DESCRIPTION

Figure 1:
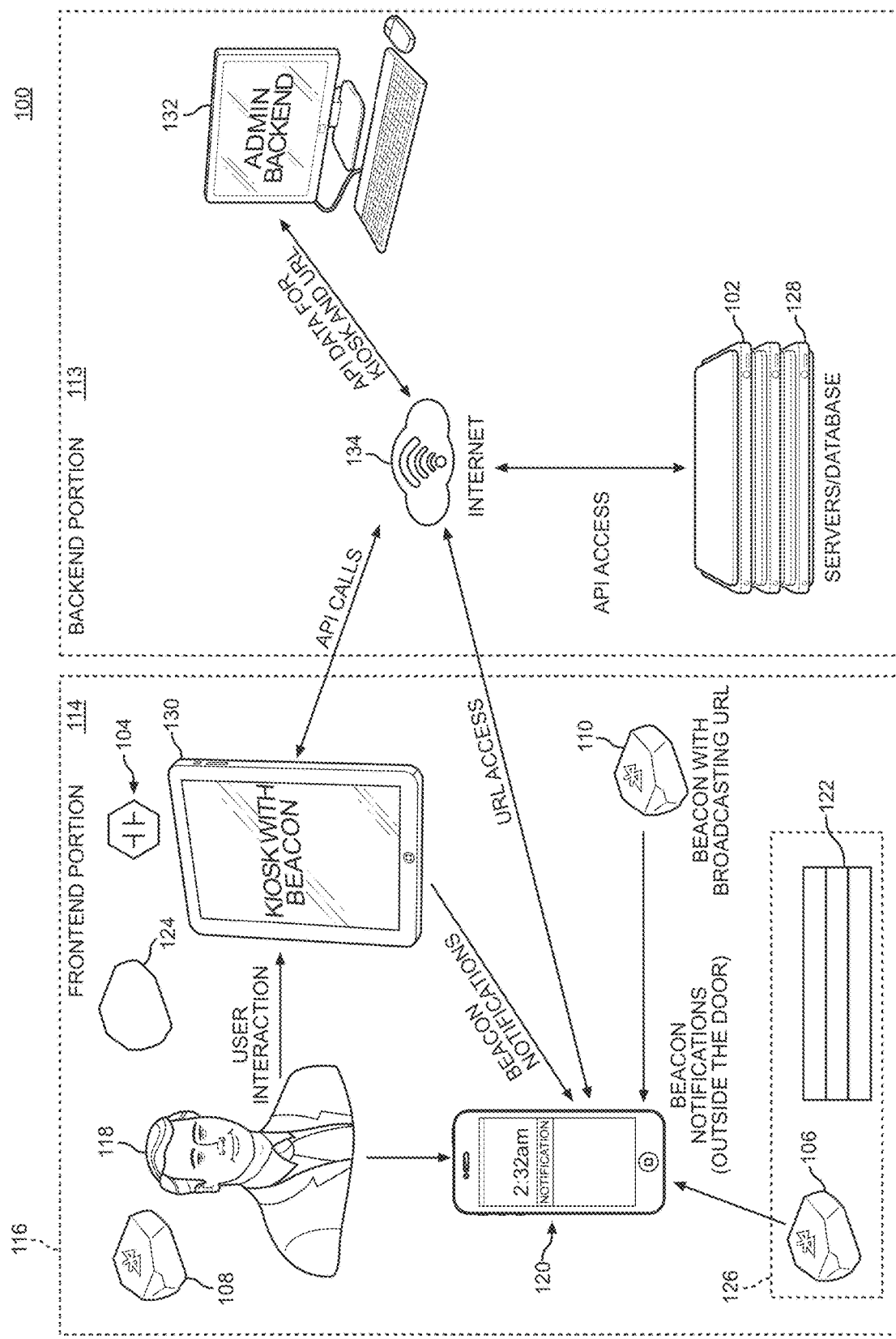
FIG. 1 is a schematic architecture diagram of an example system constructed in accordance with the present disclosure.

Generally speaking, embodiments of the present disclosure are directed to messaging architectures and methods, and more specifically, but not by limitation to systems and methods that allow for messaging using a distributed architecture. In some embodiments end point devices (user equipment "UE" or also referred to as a communication device) can transmit and receive content relative to the distributed architecture without having to install an application to enable the messaging services. These UEs can send and receive messages using a low level protocol that is native to the individual UE. For example, the low level protocol can include a native notification functionality. For example, in iOS™ a native notification functionality is available through the Apple Wallet™ functionality using a digital wallet pass. In Android™ operating systems, a native notification functionality includes a notifications panel functionality. In some embodiments, notification through Apple Wallet™ and Android™ is accomplished through Passkit™. In some instances, the APIs utilized by systems disclosed herein deliver application-less content to a UE.

Each type of communication device comprises its own unique native notification functionality (based on OS) and the messaging architectures disclosed herein can be adapted to communicate with each of these native notification functionalities to deliver content to UEs without requiring the UE to install an application in order to send and receive messages such as notifications and/or content. In this way a content delivering party such as a merchant can transmit messages to a UE without requiring the UE to install an application that is specific to the merchant. These features provide a technical solution to a technical problem arising from the inability of content providers to deliver content to UEs without requiring the UE to install and execute a specific application. In one example, a merchant typically creates an application in order to deliver content or offers to interested parties/devices. This requires an interested party to install an application on their UE in order to receive these offers/content. This is a major hurdle to adoption both for the interested party and the merchant. The interested party must take time to install and configure an application from the merchant. Correspondingly, the merchant must create various versions of their application in order to serve devices having different operating systems and device configurations. Each of these applications requires constant maintenance by the merchant in response operating system and/or device specific changes which can occur on a frequent basis.

In some embodiments, the UE receives IOT application-less engagement content using a low-level or native protocol or UE device native notification functionality, which interacts between communications and OS kernel services. An IOT device as disclosed herein generates an engagement PUSH notification which interacts with UE device native notification services. URLs are automatic generated by the IOT backend system (could also occur at the IOT device level) and PUSHED to an activated device based on UE data such as, but not limited to, real-time location, proximity, geofence, beacon, pass types, groups, and end points.

In an example use case, a hotel house keeper activates safety button (could be physical or virtual) on her mobile device which implements a safety pass file (discussions on low-level protocol files are disclosed in greater detail herein). When the button on the mobile device is depressed by the user a URL is generated, and an ALERT notification is sent via WiFi, Bluetooth or any other suitable communication protocol to other UE devices which have implemented a safety pass file as a native notifications. This example illustrates an aspect of local safety alert. An example of an embodiment related to local safety alerts is illustrated an described in greater detail with respect to FIG. 11.

Utilizing a low-level and native protocol or notification functionality of each specific device and/or operating system rather than a specific application allows for provision of notifications and/or content to a UE outside of traditional application-based approaches.

Also, in some embodiments, the systems and methods used herein provide for the ability to provide targeted content to UEs without collecting personally identifiable information of an end user of that UE.

Services provided by systems disclosed herein are based on, but are not exclusively limited to, near-field communications. Tools for service offerings include System on Chip (SoC) embedded devices, wearables, smartwatches, sensors, beacons, dongles, and customer cell phones (e.g., Smartphones). General aspects allow a chip wearer to perform simple tasks such as open automated doors, authorize payments, verify identity, use of elevators, and so forth. These chips also allow a backend system to identify a person's location within a monitored space and take action based on location and a database of the individual's preferences, such as when a locational center of gravity is determined and used, as will be disclosed herein.

A centralized radio access network (C-RAN) is used in some embodiments. A radio system as utilized herein is modular and leverages multi band, multi-layer, and multi standards that can evolve to 5G network in one or more embodiments, the electronic devices comprise wearable electronic devices, sensors, beacons and dongles that communicate with each other via low level protocols. The wearable electronic devices may comprise smartwatches associated with identification information of a user. The electronic devices communicate through a low level protocol, such that each device has the ability to pass messages and information from one device to any other device. For example, in the event of an emergency, first responders communicate through a Centralized Radio Access Network (C-RAN) utilizing each electronic device as a node which can pass important messages and information from the first responders to a victim or other user and vice versa. In certain embodiments, the system and method use a plurality of beacons to determine a location of the wearable electronic device in real time. In other embodiments, the system and method use a dongle coupled to a display system to send targeted content to a nearby user.

In general, the present disclosure is directed to a wearable electronic device that communicates via near-field communications with beacons, sensors, dongles, mobile computing devices and other electronic devices. The present disclosure couples smartwatch devices with stationary electronic devices, mobile computing devices, and Internet of Things (IoT) capable devices to provide targeted services and capabilities to a user.

In an exemplary embodiment, a hotel or other related establishment offers a smartwatch of the present disclosure to visitor or patron users. The smartwatch has an identification associated with the user. Various devices throughout the establishment will recognize the smartwatch as being associated with the user as the smartwatch enters a predetermined range of communication of each device. In certain embodiments, the device is an electronic door lock sensor which is operable to switch from a locked state to an unlocked state, or vice versa, either upon detecting the presence of a predetermined smartwatch or upon receiving a signal from the smartwatch of the user. In other embodiments, the user authorizes payments at businesses, provides personal identification information, or controls an elevator via the smartwatch. It is to be understood that present disclosure is not limited to a hotel environment. In certain embodiments, the smartwatch also communicates with other electronic devices on the Centralized Radio Access Network (C-RAN), such as electronic locking devices in vehicles or other buildings. The smartwatch and other electronic devices comprise embedded systems having Radio Frequency (RF) modules that facilitate transmitting and receiving radio signals between two or more devices. In some embodiments, the embedded systems use a Software-Defined Radio (SDR) radio communication system.

The smartwatch, sensor, beacon, and dongle communicate via near-field communications through the C-RAN. Each device comprises a chip designed with two-way communications capability through either cellular, WiFi, Bluetooth, ZigBee, a mesh network or other suitable communication protocol. In particular, each device communicates through a low level protocol such as ZigBee, Bluetooth, or other suitable protocol. As such, in the event of a natural disaster or other emergency in which higher level protocols such as WiFi may be unable to function, the electronic devices of the present disclosure will still have the ability to communicate via the low level protocol. Each chip has a communication range which varies from a very short distance measured in inches, to a medium range of around thirty feet. For example, a chip with a small range is better suited for communicating with electronic door locks and vendor purchases such that the device receiving the signal recognizes the specific chip associated with the user.

The smartwatch or other wearable electronic device comprises both short range and medium range near-field communications. An example computer system that may be used with the smartwatch is illustrated and described with respect to FIG. 7. In one or more embodiments, the smartwatch also comprises a WiFi hotspot adapter, at least one microphone, GPS, and a camera. The smartwatch may take text or audio input in a first language, translate the input into an output in a second language in real time, and provide the user with the translated output. In certain embodiments, the smartwatch comprises a plurality of applications which allow the user to confirm purchases, respond to offers, receive texts and e-mails and see various displays.

In some embodiments, the user establishes a virtual boundary or "geo fence" that contains the smartwatch. For example, a parent can establish a child safety zone and receive notifications if his or her child leaves the safety zone. In certain embodiments, the user draws a virtual boundary IDENTIFIES IN/OUT A DURATION WITHIN BOUNDARY on a computing device that defines the geographical boundaries of the safety zone. When the communication system detects that the GPS coordinates of the smartwatch are outside of the virtual boundary, it sends a notification to the user. In other embodiments, the smartwatch, IOT safety button (provided as a virtual or physical button on a communication device) also comprises various sensors and buttons that trigger alerts. Such alerts may trigger upon removal of the smartwatch, crossing a virtual boundary, pressing a panic or emergency button, or other suitable triggers. In certain embodiments, a communication device can generate a URL that is pushed via a WiFi connected web browser client. This embodiment is indicative of a smartphone or other device that connects to an IOT system. When a button is depressed on the device a URL is generated and an ALERT notification is sent via WiFi or Bluetooth to other UE devices containing our implementing a safety pass file as a native notifications.

The smartwatch communicates the alerts and notifications via the low level protocol, such that the alert is relayed among one or more devices until it reaches the proper recipient (the local police authorities, emergency responders, parents, etc.).

The sensors comprise electronic devices that test for a condition and perform an operation if the condition is satisfied. In particular, the electronic devices test pass/fail normal operating conditions and execute pass/fail testing in real time per each process event. An example of such a pass/fail testing is comparing a real time measurement to a predetermined threshold. If the real time measurement exceeds the predetermined threshold, the sensor will perform the operation, such as transmit a signal or activate an alarm. Sensors which communicate with the smartwatch and other electronic devices of the present disclosure include door locks, elevator controls, carbon monoxide sensors, Geiger counter, explosive/radiation detectors, thermostats and other heat sensors, motion detectors, among other electronic sensors. The sensors also communicate via a low level protocol and are capable of passing messages and information as a node to and from other devices of the present disclosure.

In one example of a sensor, a water sensor is provided that can be associated with a joint of a pipe. For example, at each point of connection between segments of pipe or a connection to a fixture or valve, a water sensor is wrapped around the pipe. The water sensor is capable of detecting the presence of water and transmitting a notification to a proximate device or a remote device through beacon communication. That is, the beacon architectures disclosed herein can include various sensors for electricity, power, air, water, fire, emergency, biometric information, and so forth. Notifications regarding any of these physical conditions can be reported using the application-less notification features described herein.

In various embodiments, the present disclosure can provide notifications directly and/or indirectly to an emergency reporting system. The IOT safety button devices and their corresponding architectures of the present disclosure can be configured to communicate with these and other first responder/emergency systems and provide notification in an application-less manner as described herein. These features also allow for public service messaging and endpoints using communications and wireless emergency alerts (WEA) for provision of information to tourist and citizens based on their geo-location.

Beacons and their geo-fences as disclosed herein comprise location and communication systems and are in communication with the smartwatches, sensors, display systems, dongles, and other computing devices. The beacons are mesh beacons, in that each beacon also communicates with other beacons. In some embodiments, the beacon transmits updates to at least one of other beacons, smartwatches, IOT devices, sensors, display systems and dongles.

In certain embodiments, the communications system identifies a location of the user within a monitored space using the geo-fences. Each geo-fence has a fence radius where API (Application Programming Interface) communications can be received from a low-level protocol passport file to determine a distance between the UE and the geofence. The communication system, through a controller, determines a location of the UE in real time based upon the plurality of distances calculated and a predetermined location of each geo-fence radius. In some embodiments, the communication system determines a center of gravity of the geo-fence receiving communications from the API to determine the location of the UE.

Upon determining the location of the user by identifying the location of the UE in real time, the communication system engage via UE native notifications can engage or otherwise send the user targeted content based on the user's location and proximity to certain attractions. A central server receives updates on the location of the user in real time, and then sends out alerts, notifications and targeted content. The system uses a hierarchy of multiple protocols: if certain protocols are unavailable to the system, the system automatically switches to a low level protocol or vice versa to a high level protocol.

The communication system stores at least one business rule, a condition and a trigger for activating the delivery of targeted content. For example, if the communication system detects that a user is walking in front of a gift shop, the communication system will send the user a notice of an impulse sale or other deal at the gift shop. Here, the business rule and condition is created by the administrators of the gift shop which states an impulse sale is available for fifteen minutes to customers who meet particular user criteria. The trigger occurs when the location of the user, particularly the smartwatch associated with the user, is identified as being within a predetermined distance of the gift shop. In certain embodiments, the communication system determines targeted content based on the user's location and information regarding the user's purchases or attended events. The information may be stored in a database coupled to the communication system via a computer network.

As such, the user is more likely to act upon the deal and targeted content because the offer is immediately relevant. The targeted content may comprise a deal with a short time limit, on the order of minutes, because the user will be capable of acting upon the deal since the content is targeted to the user's needs in real time.

In some embodiments, a UE can include a family security tracker use case and specifically a family security tracker for kids. In some embodiments, an IOT safety device (e.g., button enabled device illustrated in FIG. 12), smartwatch can be used as for healthcare, for hospitality and resorts, within an IoT for education, and in conjunction with a system comprising a merchandise security tracker and geo-fence.

Another use case of the present disclosure is in universities or schools which issue each student a UE device along with their passport/wallet pass file for identification card. The UE would interact with various sensors distributed throughout the school, such that the student would only have access to areas in which they have permission. Furthermore, in the event of an emergency, first responders have a way in which they can validate an identity of a student, determine a location of the student, and determine how they can reach the student.

In some embodiments a system of the present disclosure can comprise a IOT, UE, smartwatch, sensor(s), beacon(s), dongle(s) in an example communications system.

Some embodiments of the present disclosure are directed to a system for delivering consumer engagement notifications targeted advertisements to mobile devices using a WiFi geo-fence beacon system. In general, the present disclosure allows for the user of a beacon that is configured to transmit push notifications to mobile devices in a broadcast area of the passport/wallet pass. Regardless if the mobile device is registered with the beacon and/or backend system, the passport/wallet can be used to push messages to mobile device in its broadcast area using PUSH notification protocols available on the mobile device. Other methods of communication through short range wireless methods are also likewise contemplated.

If the mobile device has never encountered the passport or beacon before, the beacon can transmit an initial PUSH notification to the mobile device that includes a URL link. This notice is displayed on the mobile device screen. The user can click the URL link in response. When the user clicks the URL link a browser session is opened on the mobile device, which transmits a message back to the backend system. This response message will not include any identification that represents the mobile device due to the fact that this is the first engagement of the mobile device with the geofence, pass, WiFi, beacon system. The backend server recognizes that the mobile device is an unknown or unidentified device. Upon this determination, the backend system will obtain mobile device information that is used to create a fingerprint of the mobile device. The fingerprint is a unique identifier for the mobile device that can be created from any one or a combination of data such as browser type and version, operating system and version, screen resolution, supported fonts, plugins, time zone, language and font preferences, and even hardware configurations, and combinations thereof.

The fingerprint is stored on the mobile device and is utilizable in future communications with the backend system through engagement with the IOT, geofence, WiFi, beacon. For example, when the mobile device enters the broadcast area of the beacon in a future event, and the PUSH notification is received, the fingerprint is transmitted when the user clicks on the URL in the PUSH notification.

As the user is utilizing their mobile device and/or engaging in behaviors such as purchasing items, playing games, and so forth, the mobile device transmits information that is indicative of these behaviors to the backend system. The backend system can then begin to assemble and periodically update a user profile that includes empirical data about the user's behaviors.

In some embodiments, this behavioral information is transmitted synchronously when the mobile device is in range of the geofence, WiFi, and/or IOT beacon. In other embodiments, behavioral information can be stored on the mobile device and transmitted to the backend system asynchronously. For example, if the user is engaged in commercial behavior outside the range of a geofence, WiFi, beacon, the behavioral data is stored on the mobile device and is then transmitted to the backend system via a geofence, WiFi, beacon when the mobile device comes within the broadcast range of the beacon and engages with the backend system through the aforementioned PUSH notification and URL response methods.

In some embodiments, in addition to using a fingerprint or other non-cookie related tracking method, the beacon system can also utilize cookies stored on the mobile device to gather behavioral information. Cookies can be used in instances where asynchronous collection and transmission of behavioral data is desired. That is, the cookie can and/or browser can store information that is transmitted to the backend system as needed.

Once a behavioral profile for the mobile device/user is created, the backend system can begin transmitting consumer engagement content, offers, alerts native notifications such as advertisements to the mobile device when the mobile device is within range of the beacon. In another advantage, the unique identification of the mobile device and creation of a behavioral profile using empirical data of the user allows the backend system to leverage these data to create and disseminate highly relevant and/or targeted advertisements to the user.

Also, advantageously, the use of PUSH notifications through common protocols available on many mobile devices allows for communication between the backend system and the mobile device through the beacon without requiring the mobile device to install or execute a specifically configured application to receive offers from the backend system. That is, the backend system can provide initial engagement messages with any mobile device within broadcast range of the geofence, WiFi, beacon. The user is not required to install any applications or connect to any specific devices to receive the PUSH notifications. Merely by interacting with the PUSH notifications the user can selectively choose to receive targeted engagement pass type ticket, event, membership, coupon, loyalty reward offerings from the backend system by clicking on the URL and optionally following requests from the backend system for information. Example GUIs are illustrated in FIG. 6 and are described in greater detail herein.

FIG. 1 illustrates an example system 100 of the present disclosure, in the form of a distributed or beacon architecture. The system 100 generally comprises a server 102, one or more sensors such as sensor 104, and one or more beacons such as beacons 106-110. The system 100 can include additional or fewer sensors and/or beacons than those illustrated. For illustration, the system 100 is logically divided into a backend portion 113 and a client service or frontend portion 114. The frontend portion 114 is present in an environment 116 where a user 118 is present with their communication device 120 such as a store, casino, hotel, school, and so forth.

In one example embodiment, the beacons 106-110 are distributed around the environment 116 in key locations where discrete content is intended to be provided. For example, beacon 106 is associated with a merchandising shelf 122. Content, including offers for coupons for products sold on the merchandising shelf 122 are triggered when the communication device 120 is in proximity to the merchandising shelf 122 and the user is responsive to an application-less notification from the beacon 106.

In another example, beacon 108 is associated with a display device 124, such as a television screen in a store or casino. When the communication device 120 is in proximity to the display device 124, specific content is displayed on the display device 124. In yet another example, IOT DEVICE OR beacon 110 can be placed anywhere in the environment 116 and can be configured to provide content for yet another purpose.

The content provided to the communication device 120 can be based on the nature of the business of the particular environment. In embodiments such as these, the beacon 108 can comprise a dongle that can be installed on the display device 124 such as a television. In general, dongles combine the memory of a USB drive with the communications capability of a beacon plus the ability to communicate via Wi-Fi. Dongles contain no battery but receive their power from a computer or TV and attach through a standard USB port.

A dongle of the present disclosure can be programmed to receive the identifiers of the communication devices in its vicinity and use the server 102 to identify the parameters or attributes of the device. The dongle can then instruct the display device 124 to play a specific message based on the user. The message can be a full video, a crawl or some other on screen activity. Dongles can even communicate with Smartwatches and Smartphones and respond to text messages. In an example use case a dongle can recognize an audience of people at a hotel for a duck hunters convention, show an ad for an outdoors company, and provide discount coupons for those who text 'Duck' to a certain number. Dongles of the present disclosure are powerful tools for real time and local communications.

In one or more embodiments, the server 102 is configured to provide these various types of content based on a variety of factors. In some embodiments, the server 102 is configured to select and provide content based on the beacon encountered. In various embodiments, the delivery of content is controlled, in part, by a logical link such as a URL that is associated with a particular beacon. In one example, each beacon 106-110 is provided with a dedicated and fixed URL (e.g., dedicated logical link). The URL points to content that is delivered to (or accessed by clicking the URL) the communication device 120 based on the provision of a notification. The URL can be fixed to the beacon or can be dynamically allocated by the server 102 in some instances.

A beacon as disclosed herein is configured to send and receive information to and from other devices such as communication devices. Beacons communicate using multiple protocols and can communicate with Smartwatches, sensors, TV dongles, and computers. Some beacons communicate with other beacons and are referred to as mesh beacons. Each of these beacons can be mapped by location. By attaching only one beacon with a computer (or other digital device such as a TV or sensor), the computer can identify which beacons in the mesh test positive for a specific condition.

Figure 7:
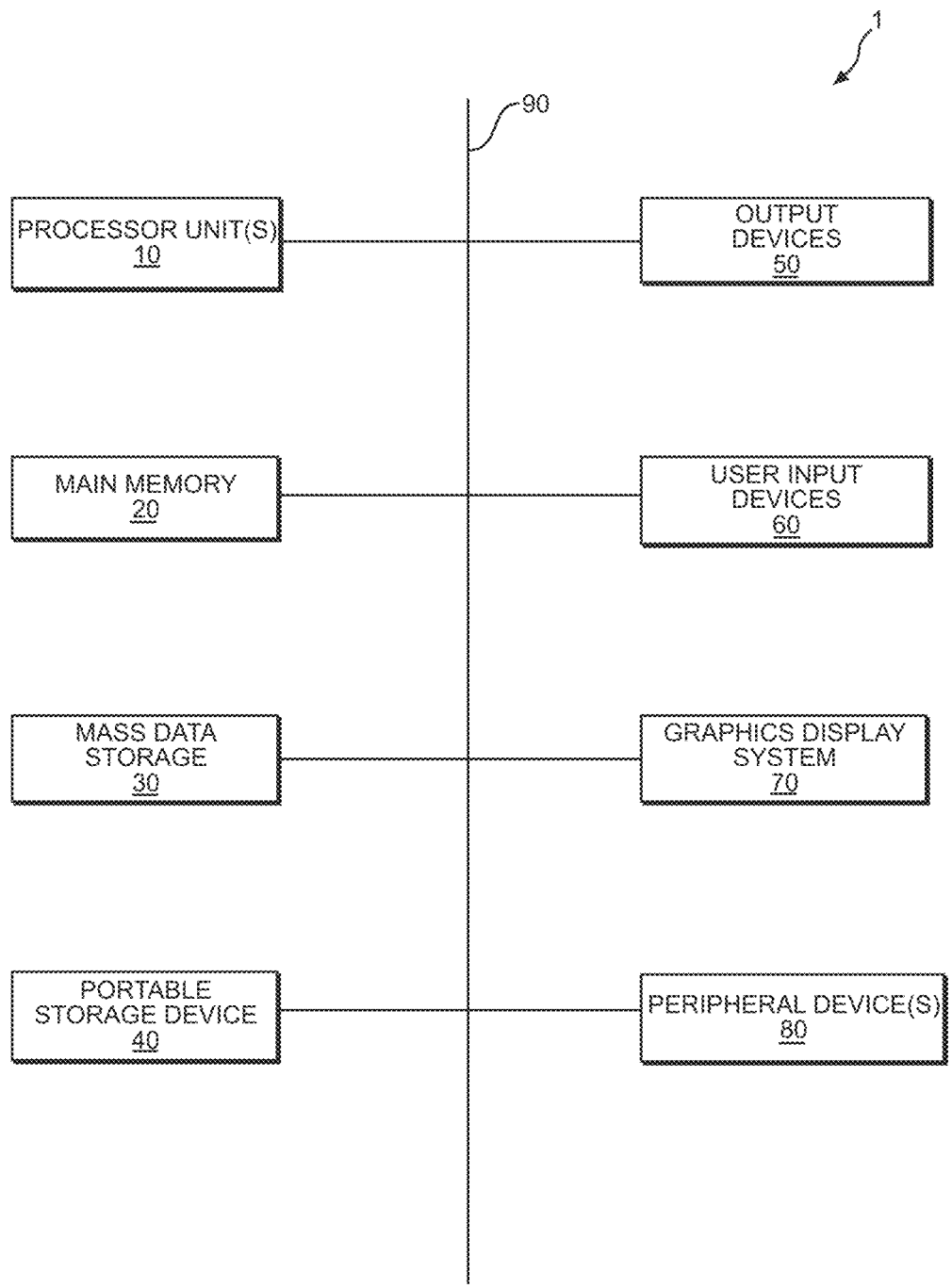
FIG. 7 illustrates an exemplary computer system that may be used to implement some or all embodiments of the system.

Mesh beacons allow computers (e.g., server 102) to identify which beacons are receiving communications from which communication devices. That is, the server 102, or other similar computing device coupled to the server 102, can function as a controller to coordinate functions of IoT devices in a mesh network. The controller can be a computing device that is linked to the server 102 or can communicate with the server 102. An example controller includes a computing device as illustrated in FIG. 7 that has been specifically configured to coordinate and/or control use of IoT devices within an environment. For example, the controller can control the operations of sensors, beacons, and other device in a computing environment that are providing the application-less communication features described herein. In one non-limiting example, the controller could include a device such as an access point or switch within an environment. The controller can communicatively couple with a server (such as server 102), as well as a plurality of beacons or other (IoT) devices. Generally, the controller controls the operations of the IoT devices in the environment while the server is used to control or manage the controller. For example, IoT device behaviors as instruction sets can be pushed to the IoT devices in an environment by provisioning the instruction sets to controller through a server. The controller then distributes IoT device instructions individually to each (or a portion of) the IoT devices.

Figure 2:
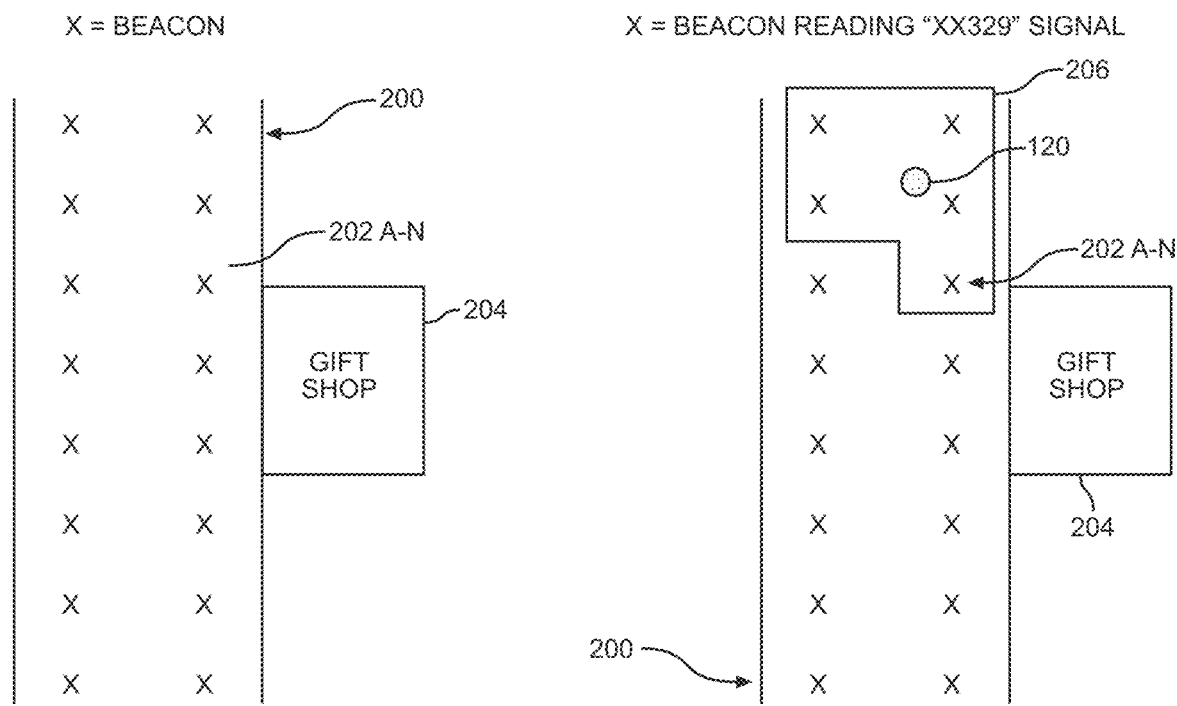
FIG. 2 illustrates the use of a beacon architecture in sensing a communication device and provision of notification and content.

Geography calculations allow the server 102 to estimate a location of a specific communication device. Consider a hallway 200 with beacons arranged in a grid pattern as in FIG. 2 in view of FIG. 1. The pattern on the left shows the beacons 202a-n laid out in a ceiling of the hallway. The beacons read a code being emitted by a Bluetooth chip of a communication device 120. In one embodiment, a goal includes enticing a guest to visit a gift shop 204. Guest 'XX3Z9' has entered an area of the gift shop from the north, as represented by the dot (representing the communication device 120). The guest tripped five beacons as shown in the highlighted area 206. By identifying a center of gravity of the beacons 202*a*-*n* that were tripped, the server 102 can approximate a location of the communication device 120 and determine that the communication device 120 has entered a target zone (e.g., virtual geofence) for gift shop impulse purchases as shown. The server 102 and one or more of the beacons 202*a*-*n* can transmit a text (e.g., notification) to the communication device 120 or e-mail the user a notification of an impulse sale at the gift shop. If the database 128 associated with the server 102 identifies that a user associated with the communication device 120 played on a hotel golf course recently, the server 102 can offer the user a deal on hotel golf accessories or apparel in the gift shop 204 or pro shop of the golf course.

In general, each beacon can be associated with a virtual geofence and the virtual geofence is associated with a unique content type. For example, the content associated with beacons serving the gift shop may provide incentives for items sold in the gift shop, while beacons serving a TV display in another area of the hallway may provide content in the form of a video providing informational content.

Like sensors, mesh beacons can operate independently or as a group. In the event that communication is lost with a backend server, beacons retain their prior instructions. Because beacons communicate using multiple protocols and are powered by tiny batteries, beacons can continue to operate without electrical power or WiFi for extended periods of time.

Referring back to FIG. 1, in more detail, each beacon 106-110 is configured to trigger a notification on the communication device 120. The notification can be triggered when the communication device 120 enters a virtual geofence that surrounds the beacon or otherwise enters short range connection with the beacon. For example, beacon 106 includes a virtual geofence 126 that surrounds the merchandising shelf 122 and can extend to any distance desired. When the communication device 120 contacts or breaches the virtual geofence 126, the beacon 106 will cause a notification to be presented on the communication device 120. The methods and components used to cause the notification on the communication device 120 are described in greater detail infra, but in general the beacon 106 will trigger a notification using a native notification functionality of the communication device 120 or through browser notifications.

The notification generally includes a URL link (either dynamically or permanently provisioned to the beacon) that points to content stored on a database 128. It will be understood that the database 128 can include a local or cloud-based repository. The database 128 can be queried for content in real-time as well using a kiosk 130. In some embodiments the kiosk 130 can utilize an Android application which is used for promoting offers using beacon technology. Customers (users) entering or exiting the environment 116 use the kiosk 130 to initially register with the system 100 and obtain content or opt-in for additional notifications/content through their communication device. To be sure, the kiosk 130 registration process is not required in some embodiments. In embodiments that do include a kiosk, the kiosk 130 is configured to illuminate in response to motion or user presence.

In some embodiments, the kiosk 130 includes a search capability and connects to a real-time cloud database (e.g., database 128), provides analytics, multi-language support, a cloud-based rule engine, video chat (record and save to cloud), bidirectional communication to chat, motion sensing, transmission of various data sent to Smartphone and/or email through an application-less architecture as described herein.

In some embodiments, the kiosk 130 is configured to display an actionable message on the screen such as "Do you want to win today?" with actionable buttons Yes and No. Once the user hits "Yes" the user is directed to a new screen that could include content such as a game of chance. If selected the user is directed to a page with an offer. If the offer is accepted they are directed to a registration page where the user is asked to enter an email identifier and claim their offer.

When the user clicks on an icon or other part of the game they can receive a notification from a beacon associated with the kiosk 130. This notification is received on the communication device 120 allowing the user to perform the same action as on the kiosk 130. For example, the user can click on a notification, open up a URL in a browser of their communication device 120, and receive an offer on the browser. The user can claim the offer by submitting an email address in one example use case. The user can also decline the offer. In some instances actions and/or feedback can be used to tailor future offers including positive feedback (offers that are clicked or accepted) and negative feedback (offers that are ignored or refused).

Administrators can design and create new offers and set expirations for the offers using a backend system 132. Old offers can be replaced with new offers according to a schedule. For example, if an administrator creates 25 offers using the offer creation platform they can set offer active date and time as follows: Offer 1—From 22/01/2017 05:00 pm to 22/01/2017 09:00 pm. Offer 2—From 22/01/2017 09:01 pm to 22/01/2017 11:00 pm. Offer 3—From 22/01/2017 11:01 pm to 22/01/2017 12:30 am. Again, these are merely example schedules and can be adjusted according to the preferences of the administrator.

In some embodiments, offers are time-sensitive. For example, an offer is configured to indicate to a user that they won $100 in credits. This offer can be configured to drop in value by $1 every minute. To stop the clock the user has to complete a full signup or sign-in into an account and accept the offer.

A user who leaves the environment 116 can exit near a door enabled with a beacon (not shown but generally illustrated as beacon 110). Even without signing up through the kiosk 130 the communication device 120 can still receive a notification from the beacon placed by the door. The user receives the notification but with an offer having less value than the offer from the kiosk 130, just as an example.

To be sure, the number and placement of geo-fences and beacons in the environment is subjective and can include any number of beacons providing and number and variety of content.

In some embodiments, the kiosk 130 is connected to the Internet 134 for connectivity back to the server 102 or the database 128. In some instances, users who use the kiosk 130 and users who do not use kiosk 130 both receive notifications through their respective communication devices.

As noted above, notifications can be provided on any given communication device regardless of the operating system or hardware included in the communication device in an application-less manner. In one example embodiment, a notification is presented on the communication device 120 using a native notification functionality of the communication device 120. In some embodiments, the notification is provided using a browser extension or functionality. Again, the provision of notifications occurs entirely without the use of a dedicated application that would ordinarily be provided by a merchant.

In an example embodiment, an IOT device, geo-fence, beacon passes a file or instruction set that is installed and resides in a digital wallet of the communication device 120. In this instance the communication device 120 is an iPhone and the digital wallet is Apple Wallet. In another example, the notification is triggered using the notifications protocol provided through iOS versions having this functionality.

In yet another embodiment, notifications are presented using a browser extension of a browser client operating on the communication device 120. For example, a Chrome™ browser providing a Chrome Today™ widget on a notification center of an iPhone is used to present notifications from a beacon of the present disclosure.

In iOS, the Today view screen is presented a user swipes down from a top of an iPhone. By default it shows a calendar and stock information, but other application widgets can be installed. If Chrome browser is installed, the Chrome Today widget can be added. If the Chrome Today widget is activated, the first time a beacon of the present disclosure is encountered a website title and description will appear in the Chrome Today widget.

Tapping on the website launches Chrome to the web page address transmitted by the beacon (e.g., fixed or dynamic URL). This web page can be optimized for mobile viewing, serving a welcome message to the visitor that can solicit a download of an application to further take advantage of beacons of the present disclosure. To be sure, an application is not required in order to receive the notifications disclosed herein or to receive content/offers and the use of application is an optional feature. The embodiments above describing a digital wallet pass installation do not require a browser installation to in order to receive and display notifications using a native notification function of a communication device. In these instances, a token such as a cookie are optional.

Again, in general, the systems and methods disclosed herein are not specifically and limited in presenting web pages to a user when in proximity to a beacon, but allow a Smartphone owner to interact with the physical world without the need for a dedicated application related to aspects of the physical world around them.

Thus, instead of 'pushing' information to a user (which may interfere with what they actually want to do at that time and in that location) the present disclosure allows a device owner to find and interact with physical objects in their vicinity without the need for a dedicated application.

By way of example, when a phone enters a beacon's range, the beacon automatically broadcasts a URL which is sent to the phone via PUSH notification. When the phone user clicks on the PUSH notification it opens up a URL, included in the notification, in the browser to show content available that is linked to the URL. For example if a user walks by a movie poster, a beacon broadcasting a URL behind the poster provides a trailer for the movie. This all occurs without the use of an application created by the movie theater or the movie producer/distributor.

In these examples, the beacons will push a notification to a communication device that includes a URL. The URL can be connected to a destination on a server that provides landing page that is configured by the client (referred to in some instances as an authority and delivery system). This system is the backend interface which connects to a database. When using fingerprinting techniques (disclosed in greater detail infra), the system can identify the uniqueness of the user's device and utilize this information for targeted content delivery.

As the user opens the URL, on load, the browser sends the JSON (JavaScript Object Notation) to the authority and delivery system with the fingerprint. For a new user, it sends the fingerprint as blank. For the first time, the authority and delivery system (e.g., server 102 of FIG. 1 for example) sends a payload (e.g., content) with a unique key and the fingerprint and offers payload with some additional data. This fingerprint key is saved into the local storage of the browser of the user's communication device in some instances.

The next time the same user clicks the URL, the system checks a rule engine and sends a customized engagement offers list to the user. To be sure, a rule engine can comprise a dedicated module or system that provides a set of algorithms which checks a device's behavior using previous activities (e.g., actions such as clicks and positive and negative feedback) and customizes future services or content for the particular user, for example by location and/or proximity. In some instances the provision of future content is generated through use of machine learning. The machine learning utilized herein utilizes (MDP) Markov decision process discrete time stochastic control processes for operations, games, complex simulations analysis for various purposes.

Figure 3:
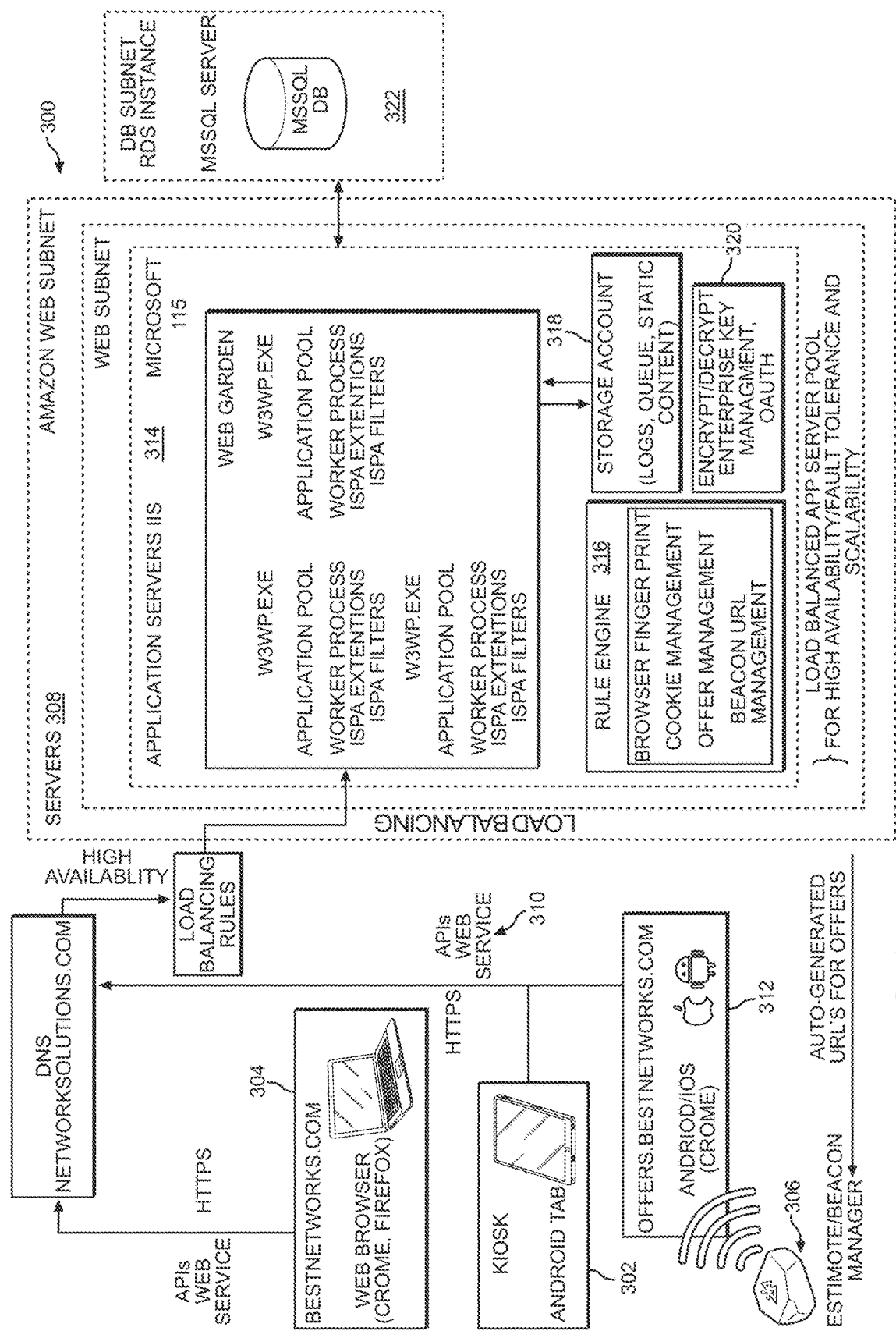
FIG. 3 is a schematic architecture diagram of another example system constructed in accordance with the present disclosure.

FIG. 3 illustrates an example beacon architecture (referred to as a system 300). In general, the system 300 comprises a kiosk 302, a webserver 304, a beacon 306 (or corresponding geo-fence), and a server 308. The kiosk 302 can include any of the features and functions described with respect to the kiosk of FIG. 1. In some embodiments, the kiosk 302 utilizes an application programming interface (API 310) to communicate with a landing page interface 312 provided by the server 308 or another computing device.

In some embodiments, the kiosk 302 provides a user with an initial point of contact where the user can register their communication device and opt-in to receive content. Thus, the kiosk 302 receives initial content preferences for requested content and authorization to deliver content to a specific communication device. This can occur in some instances by presenting a scannable object at the kiosk 302 such as a barcode or quick response (QR) code. When scanned, the communication device can download a token or other application-less means for allowing notifications based on the device-type such as a digital wallet pass. This can include configuring a native notification functionality (e.g., using the digital wallet pass) or enabling notifications through a browser client on the communication device.

After the communication device is configured to receive notifications, the communication device can receive both notifications and/or content from a real-time database based on parameters of the request. In some instances, the real-time results and search can also be performed on the kiosk 302.

To be sure, the system 300 can obtain relevant content for a communication device from real-time services online. Also, the system 300 can collect responsive feedback relative to content provided to a communication device in order to build a device preference profile or record used by a rule engine 316 (disclosed below) to update the content over time based on, for example, negative and positive feedback received.

The beacon 306 provides notifications and access to a dynamically generated URL that directs to the landing page interface 312. The offers or content disclosed herein are provided through the landing page interface 312.

While a beacon 306 is illustrated in FIG. 3, one of ordinary skill in the art will appreciate that the beacon 306 can include any one or a number of different Internet-of-Things (IoT) devices. These devices can include sensors, autonomous computing devices, beacons that can incorporate sensors, and any other computing device that is configured to perform the application-less communication processes disclosed herein. In some embodiments, the application-less communication of information can include the display of a QR code or a barcode that provides the static URL, rather than an IoT computing device.

In various embodiments, the server 308 includes an application server layer 314 that mediates communication with the various beacons and/or kiosks distributed within a given environment. The server 308 also controls beacon/kiosk/geofence behavior and controls engagement/offer/content delivery through the landing page interface 312.

In various embodiments, the server 308 comprises a rule engine 316 that manages features such as token generation (which could include a browser cookie as an example), browser/device fingerprinting, offer/content management, and beacon URL management, where URLs are assigned to beacons on a static or dynamic basis. As noted above the rule engine 316 can implement machine learning in order to deliver relevant and real-time content to communication device(s) communicating with the beacons of the system 300.

In some embodiments, the server 308 comprises a storage account 318 and encryption/decryption services 320. The storage account 318 can store event logs, queues for content, static content, and so forth. The encryption/decryption services 320 allow for enterprise key management services and user authorization.

In some instance, the server 308 includes a relational database system 322 that cooperates with the rule engine 316 to store information indicative of communication device behavior and so forth.

In some embodiments the kiosk 302 receives message offers from an IOT device 306. A backend application server 308 generates URLs for specific offers for broadcast by the IOT device 12. The kiosk 10 can be accessed using a web browser through a dedicated domain served by a DNS (Domain Name System) server. A load balancer can be implemented between DNS server and the application server 14. The application server(s) 314 comprise(s) a plurality of application pools within a web garden. A rule engine 316 implements browser fingerprinting, cookie management, offer management, and/or IOT device URL management features. Encryption and/or other security measures are implemented at the application server level as well.

Figure 4:
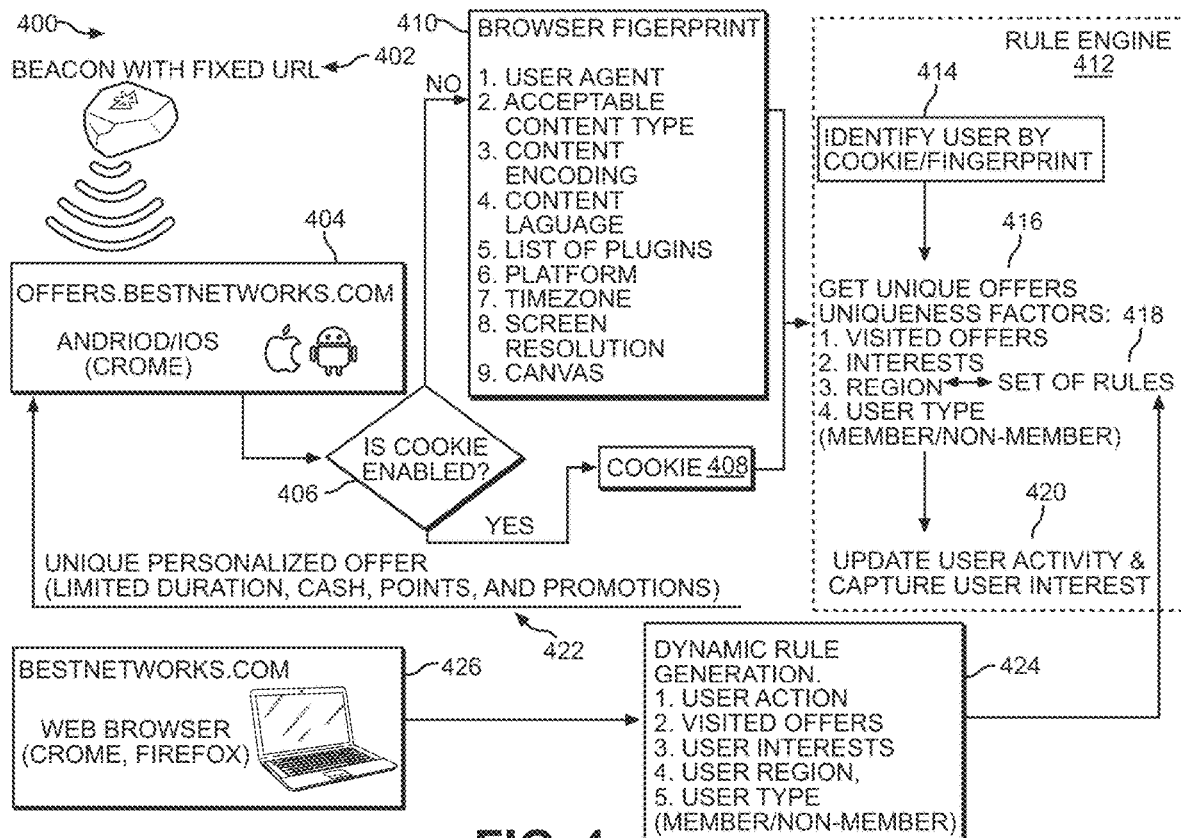
FIG. 4 is a schematic diagram depicting a browser fingerprinting flow with architecture components in accordance with embodiments described herein.

FIG. 4 is a schematic workflow through another example system 400 that specifically illustrates notification features described herein with a stand-alone rule engine. The system 400 includes one or more beacons 402 that are linked to a static or dynamic URL 404 provided through an interface. When receiving requests through the beacon 402, a process 406 is performed where a server determines if a communication device connected to the beacon 402 is using either a cookie 408 or is being detected through fingerprinting 410. In more detail, browser/device fingerprinting allows for a rule engine 412 to determine various parameters such as a user agent, an acceptable content type, content encoding, content language, plugins, operating system (e.g., platform), time zone, screen resolution, and canvas—just to name a few. One of ordinary skill in the art will appreciate the parameters available for fingerprinting of a device.

Once relevant device-related information is gathered, the rule engine 412 utilizes this device-related information to identify a user (e.g., device) through its cookie or fingerprint in process 414. This includes determining if the device is known or not. If the device is not known a new fingerprint can be generated or a cookie provided to the device. The rule engine 412 tracks interactions and device behavior such as real-time location tracking through beacon contact, content feedback, and so forth. A unique consumer engagement offer can be created in a process 416. Rules are generated and stored in process 418 and the updating and tracking of behaviors is illustrated in process 420. Customized content is delivered in process 422.

Dynamic rule generation can also be performed in process 424. This process 424 can occur at the rule engine 412 or in another server that manages or includes the rule engine 412 (see FIG. 3 for an example rule engine embedded in a server). The process 424 includes dynamic rule generation based on device/user behavior collected in reference to an interface 426 that is accessible to the user. This interface 426 can include a kiosk or website access through any device. The interface 426 can present GUIs that collect data from users and/or provide content. As the user provides their user data or interacts with the interface 426, this data is incorporated into process 424 that is responsive to user actions (e.g., clicks), visited offers (e.g., user clicking on URL in a notification), user interests (explicitly provided or determined), user region, and so forth.

Each of the system embodiments disclosed herein is capable of being exemplified and executed within a cloud-based environment, to the extent that such system components are amenable to embodiment in a cloud-based environment. Thus, servers and rule engines can be virtual computing devices in a cloud in some instances.

The rule engine 412 can identify users/devices through use of cookies and/or non-cookie identification such as fingerprinting. Unique offers are created based on factors such as visited/prior communicated offers, preferences/interests of the user, region, user type, and/or combinations thereof. The rule engine 412 is also configured to update user activity and capture user interest, such as what the user clicks on, what they buy, what they interact with, and so forth. Dynamic rule generation occurs in a dynamic rule generation module 424. The dynamic rule generation module 424 serves tailored offers to a website 426, for example. Unique personalized engagement offers can be generated by the rule engine 412 and transmitted to users through the IOT device(s) such as IOT device 402. In some embodiments, the rule engine 412 can make a determination if a cookie-based identification of the user/device is available. If so, the rule engine 412 relies on a cookie that resides on the device with which the IOT device is communicating (e.g., through a selected URL 404 that serves a message). Otherwise, a fingerprint or other non-cookie tracking and ID process can be utilized.

In some embodiments, an IOT device-based message service and system allows for IOT devices to communicate engagement offers when the user is offline and/or is using a device that is incapable of using WiFi and/or other short-range wireless communication methods. In some embodiments, the system provides WiFi access to users in order to facilitate the transmission of engagement offers to the user. In these embodiments, the user can register with the system in order to gain access to WiFi.

Figure 5:
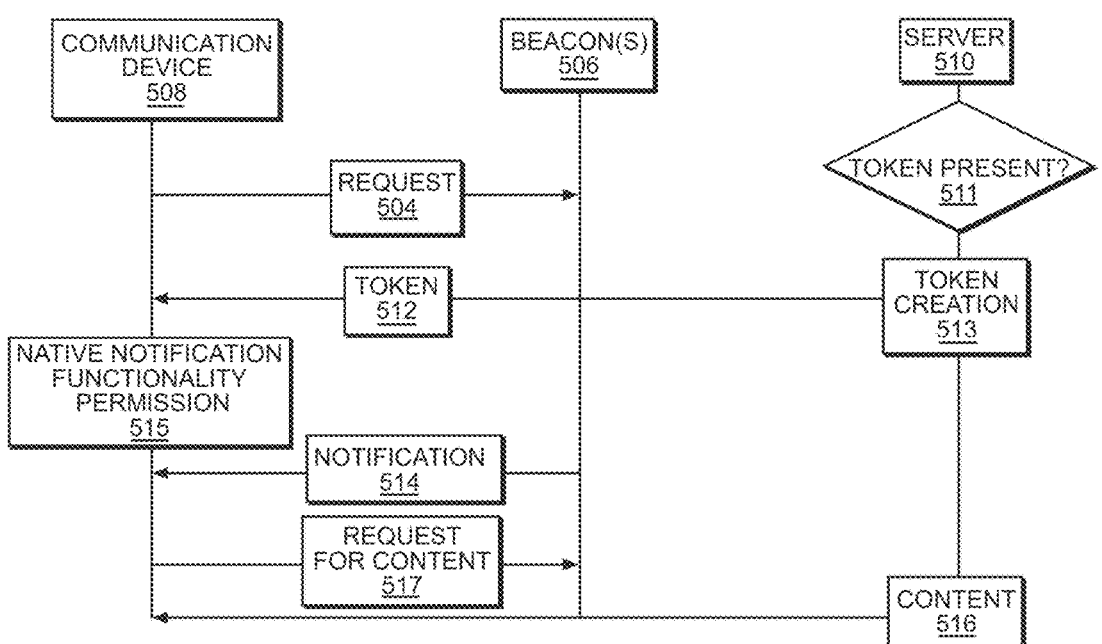
FIG. 5 is a signal flow diagram of an example process of the present disclosure.

FIG. 5 is a signal flow diagram illustrating a method performed in accordance with the present disclosure. In some embodiments, the method includes receiving a request 504 for content by a beacon(s) 506 of a beacon architecture from a communication device 508 that is in short-range communication proximity to the beacon(s). In general, the beacon architecture can include any of the systems described herein that are consistent with the functional descriptions provided in FIG. 5. In general, the beacon architecture illustrated in FIG. 5 can include a server 510 and the beacon(s) 506.

The method also includes a token 512 that is transmitted to the communication device 508 that allows for delivery of notifications to the communication device 508 using a native notification functionality of the communication device 508. As noted herein, this can include a cookie or other means for accessing and using a native notification functionality of the communication device 508. Another example include creating or establishing a digital wallet pass on the communication device 508, which is also understood to include a process for establishing permission to use a native notification function in process 515. The use of digital wallet pass could be used in place of or in combination with the cookie described herein. When used in combination the token is used as a means for gathering device related information and the digital wallet pass is used to establish permission for delivering notifications.

In various embodiments, the request 504 is forwarded to the server 510 and the server 510 determines if a cookie and/or fingerprint (e.g., is this device known?) are present in process 511. If no fingerprint or cookie is present the server 510 can generate a cookie or fingerprint in process 513 and return a token in step 512 as noted above.

In some embodiments, the method includes a notification 514 being transmitted to the communication device 508. As mentioned throughout, the notification comprises a link to the content such as a static or dynamic URL.

In one or more embodiments, the method includes content 516 being transmitted to the communication device 508 based on a selection of the link (request for content 517). In some embodiments the content is displayed on the communication device 508 or on a display that is located proximately to the communication device 508. The content can include any digital content.

FIG. 6 illustrates the provision of a notification using a native notification function, as well as content in response to the notification. In general, communication device 600 comprises a display that includes a notification 602 that is displayed using a native notification functionality. This notification is provided through a beacon of a beacon architecture. The notification 602 includes a message portion 604 and a URL link 606. When the content 608 associated with the URL link 606 is displayed on the communication device 600 in response to a user selecting the link, the user can accept or reject the content, which in this instance includes a targeted offer.

In various embodiments, the notification 602 can be wrapped or branded with a name of an entity providing the notifications and/or content. For example, in some embodiments, the notification 602 can be wrapped with a banner or border 603 that includes a name of a casino or store providing the notifications.

In general, the present disclosure involves the leverage and use of digital wallet pass notifications (native notification functionalities) to create cognitive marketing programs, loyalty and reward programs, product promotions, engagement offers, trivia and games with social media sharing opportunities to attract, influence and retain customers. The beacon architectures allow for device to connect to smart services and terminals.

Beacon architectures of the present disclosure also allow for flexible geographic targeting by using latitude/longitude "boxes" and other geospatial representations in three dimensions. These systems can broadcast notifications to user groups using geo locations, as well as provide phased and delayed effective times and expirations for notifications and/or content.

Also, in some embodiments, the beacon architectures can leverage other notification protocols of devices such as lock screen alerts and notifications.

It will be understood that the components of the various systems described herein can be integrated and/or combined with one another in any manner desired as would be appreciated by one of ordinary skill in the art with the present disclosure before them.

FIG. 7 illustrates an exemplary computer system 1 that may be used to implement some embodiments of the present invention. The computer system 1 of FIG. 7 may be implemented in the contexts of the likes of computing systems, networks, servers, or combinations thereof. The computer system 1 of FIG. 7 includes one or more processor units 10 and main memory 20. Main memory 20 stores, in part, instructions and data for execution by processor units 10. Main memory 20 stores the executable code when in operation, in this example. The computer system 1 of FIG. 7 further includes a mass data storage 30, portable storage device 40, output devices 50, user input devices 60, a graphics display system 70, and peripheral devices 80.

The components shown in FIG. 7 are depicted as being connected via a single bus 90. The components may be connected through one or more data transport means. Processor unit 10 and main memory 20 is connected via a local microprocessor bus, and the mass data storage 30, peripheral device(s) 80, portable storage device 40, and graphics display system 70 are connected via one or more input/output (I/O) buses.

Mass data storage 30, which can be implemented with a magnetic disk drive, solid state drive, or an optical disk drive, is a non-volatile storage device for storing data and instructions for use by processor unit 10. Mass data storage 30 stores the system software for implementing embodiments of the present disclosure for purposes of loading that software into main memory 20.

Portable storage device 40 operates in conjunction with a portable non-volatile storage medium, such as a flash drive, floppy disk, compact disk, digital video disc, or Universal Serial Bus (USB) storage device, to input and output data and code to and from the computer system 1 of FIG. 7. The system software for implementing embodiments of the present disclosure is stored on such a portable medium and input to the computer system 1 via the portable storage device 40.

User input devices 60 can provide a portion of a user interface. User input devices 60 may include one or more microphones, an alphanumeric keypad, such as a keyboard, for inputting alphanumeric and other information, or a pointing device, such as a mouse, a trackball, stylus, or cursor direction keys. User input devices 60 can also include a touchscreen. Additionally, the computer system 1 as shown in FIG. 7 includes output devices 50. Suitable output devices 50 include speakers, printers, network interfaces, and monitors.

Graphics display system 70 include a liquid crystal display (LCD) or other suitable display device. Graphics display system 70 is configurable to receive textual and graphical information and processes the information for output to the display device. Peripheral devices 80 may include any type of computer support device to add additional functionality to the computer system.

The components provided in the computer system 1 of FIG. 7 are those typically found in computer systems that may be suitable for use with embodiments of the present disclosure and are intended to represent a broad category of such computer components that are well known in the art. Thus, the computer system 1 of FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, iOS, ANDROID, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1 may be implemented as a cloud-based computing environment, such as a virtual machine operating within a computing cloud. In other embodiments, the computing system 1 may itself include a cloud-based computing environment, where the functionalities of the computing system 1 are executed in a distributed fashion. Thus, the computing system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

According to some embodiments, the present disclosure is directed to IOT systems that communicate with communication devices (e.g., user devices) through short-range or near-field communications. In some embodiments, the IOT backend system comprises deployed IOT devices, beacons, sensors, dongles, mobile computing devices and other electronic devices that are distributed throughout an environment, as illustrated with various embodiments disclosed herein. As noted above, these communications can occur using low-level protocols and without the need for an application to be installed on the end user's communication device. The IOT backend system can provide targeted services and capabilities.

Specifically, the IOT backend system implements an "app-less app" technology that may, for example, use a modified Bluetooth stack that is configured to communicate with a browser or native notification functionality of a communication device that is nearby proximity and physical web discovery services of the IOT backend system. The proximity and physical web discovery services interact at a lower level within the Open Systems Interconnection (OSI) reference model stack. That is, the systems and methods described herein can operate at the kernel level.

The systems and methods further allow for interaction with kernel services such as the fax, print, phone, video, audio, and communications features of a communication device. Utilizing the technology described herein, a user does not need to download an application in order for the user to receive the information (such as notification having an offer or an alert) that an IOT device is transmitting or pushing out to their communication device.

In accordance with some embodiments, an IOT backend system comprises an IOT device (usually many IOT devices distributed around an environment) in short-range wireless communication with a communication device (such as a smartphone, a tablet, or a smartphone). In some instances, and as described above, a configurable kiosk can be implemented that allows a user to create and manage offers transmitted to the mobile device through an IOT device. The IOT backend system that communicates with the communication device through use of the IOT device. In various embodiments, the IOT device is configured to transmit a PUSH notification to the communication device that includes, for example, a URL to a resource provided without the need for an installed application being on the communication device. Also, the transmission of the PUSH notification can utilize a modified Bluetooth stack with a browser running the nearby proximity services.

Figure 8:
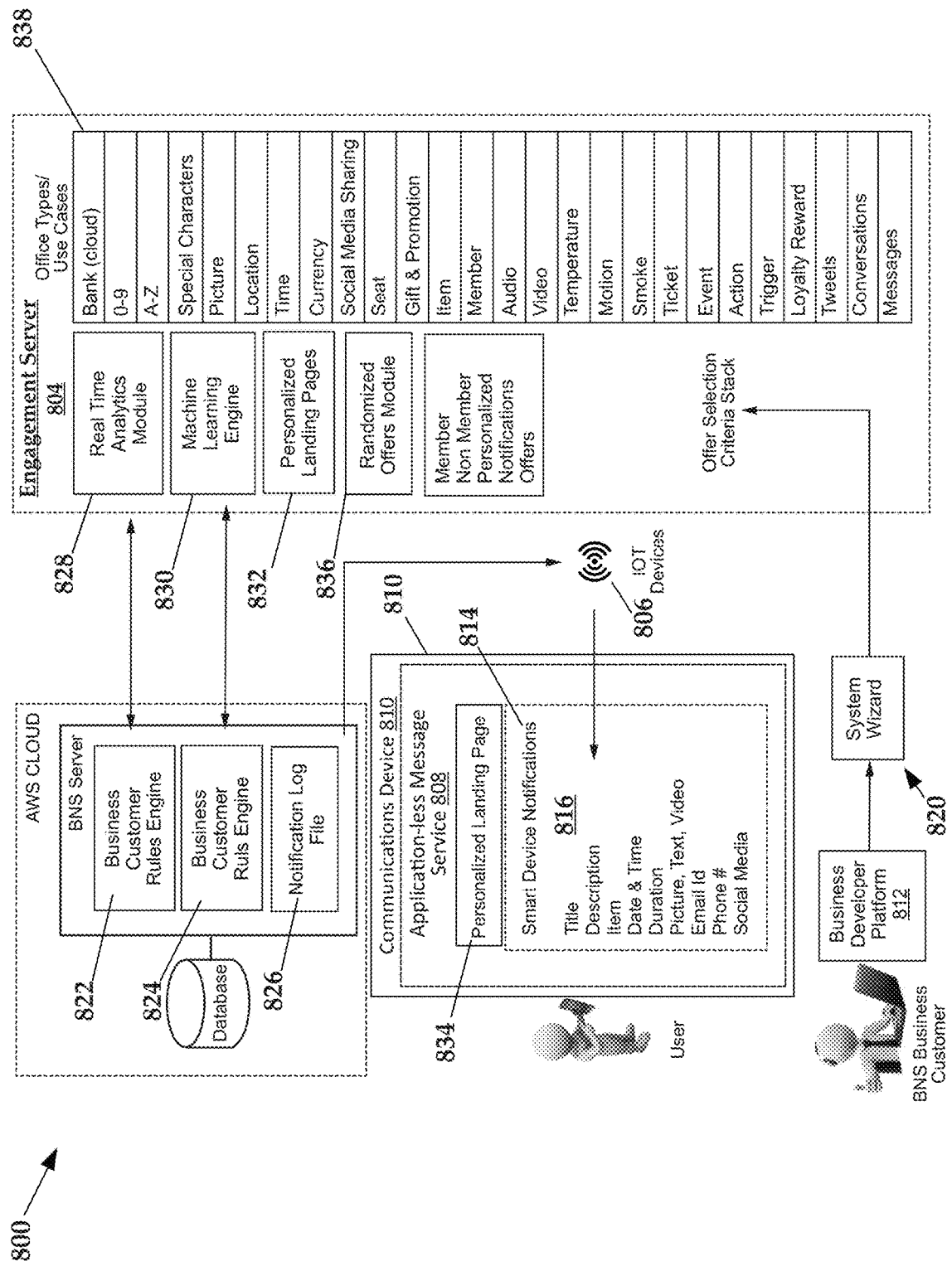
FIG. 8 illustrates an example architecture of a system that can be used to practice aspects of the present disclosure.

FIG. 8 depicts an exemplary high level technical architecture of a system. In general, the architecture includes an IOT backend system 800 that includes a BNS server 802, an engagement service 804, and at least one IOT device 806. The architecture also includes an example application-less message service 808 delivered on a communication device 810 (e.g., UE). The architecture also includes, in some instances, a business developer platform 812.

In some embodiments, IOT devices, such as IOT device 806 communicate with one another and/or communication devices based on location services, GPS data, Bluetooth connectivity, crowd-sourcing WiFi hotspot information, cell tower location data, RFID, ARVR (Augmented Reality Virtual Reality), NFC (Near Field Communication), and so forth. Using one or more of these communication protocols, PUSH notifications are sent to UE devices. These UEs use a notification access process that involves template store and retrieve notification log file process and access kernel services with token and/or authentication key for each template. Templates can be created for various UE types and configurations thereof. The template specifies the protocol types and capabilities of the UE, which indicates to the IOT system how messages should be formatted for presentation on or through the UE.

The IOT device 806 can comprise a kiosk, which could be a tablet computer with a kiosk application installed. An administrator of the business developer platform 812 can configure and monitor the kiosk from the web application. Kiosks can be placed at actual business location to attract the users and show them offers.

In another example, the IOT device 806 can comprise a beacon. The beacon is a Bluetooth low-energy device that emits offer URL to a browser client 814 installed on the communication device 810. Messages, such as offers can be broadcasted from the beacon and received by the communication device 810. When the communication device 810 comes into proximity of the IOT device 806 a notification 816 is presented on the communication device 810. This notification may redirect the browser client 814 of the communication device 810 to an offer page (see personalized landing page offers) provided by the engagement service 804 of the IOT backend system 800. In some embodiments the notification 816 may be provided as a PUSH notification to the communication device 810 and can be presented using a native notification functionality without installation of an application on the communication device 810. That is, communication between the IOT backend system 800 and the communication device 810 behaves in a client-server manner, but without the need for an application to be installed on the communication device 810.

IOT devices implemented in this architecture can utilize a combination of different protocols, such as Barcodes, QR Codes, RFIDs to the Near Field Communication (NFC), Bluetooth and WiFi covering almost all the radio frequency bands that communication devices support.

To make sure that all or most common communication devices are covered, no matter what OS they run, the IOT backend system 800 may comprise a system wizard 820 that generates alert or offer notification solutions for each use case. This component of the IOT backend system 800 allows administrators to create different types of engagements. In one example embodiment an engagement includes a promotional discount offer from any shop. In another embodiment, the engagement includes free points or cash offers from gaming club or casino. In yet another embodiment, the engagement includes car parking coupons. The system wizard 820 can also utilize other data such as payment information and unstructured datasets like audios, videos, pictures, show tickets, location, social media posts, tweets, messages, conversations, and many more.

Most of the times it is a case that these OS are continuously looking out for a signal in the background which can be a nearby Bluetooth low energy device protocol, an NFC signal, an infrared device or an open WiFi. In some embodiments IOT devices replicate these frameworks/protocols to get into the mobile devices and push the URL through this communication. This will be a one-way communication which will not have any kind of pairing just like any ad-hoc network. In some embodiments IOT devices can form smart message web to communicate with each node forming a web. The IOT device can send one type of radio frequency signal or send customized broadcast and receive another.

According to some embodiments, IOT devices within the IOT backend system 800 implement proximity and physical web discovery services, as well as implement a modified short-range wireless communication protocol stack for communicating with communication devices at a kernel level.

In some embodiments, connections can be established between the IOT device 806 and the communication device 810 using a logical link control and adaptation protocol (L2CAP) in the Bluetooth protocol stack, Bluetooth Service Discovery Protocol (SDP), and Bluetooth transport protocols (RFCOMM) using synchronous connection-oriented (SCO) links using a generic attribute profile (GATT) and then create an Internet Protocol Enumeration (IP ENUM) which used for communication at any or all kernels levels (Android and iOS). In some embodiments the IP ENUM is passed from kernel mode, to user mode, to the Bluetooth API, and Bluetooth LE discovery, which in turn spawns the virtual browser discovery by the IOT device 806 and the proximity and physical web discovery services. The SCO is an initial connection handshake between the IOT device 806 and the communication device 810 such as when a speaker sends their pair signal to the Bluetooth discovery service for Android and IOS.

Again, the present disclosure utilizes "app-less" technology where a communication device receives a notification from an IOT device of an IOT backend system. A PUSH notification is an entry point for the communication device to enter in the IOT backend system and grab, view or otherwise acknowledge or accept offers or alerts, without any application being installed on the communication device.

In some embodiments, the BNS server 802 can implement a plurality of business customer rule engines such as business customer rule engine 822 and business customer rule engine 824. In some embodiments, each business customer is provided with a business customer rule engine that customizes engagements that can be provided to their customers through their specific IOT system. The BNS server 802 can also include a notification log file 826 that tracks and stores notifications and parameters thereof. The BNS server 802 provides notifications that are passed from the IOT device 806 to the communication device 810.

As noted above, in some embodiments, the BNS server 802 leverages the engagement service 804 to create engagements. That is, the business customer rule engines can be used in combination with the engagement service 804 to create notifications and engagements (e.g., offers) that are delivered to a user.

In some embodiments, the engagement service 804 comprises a real time analytics module 828, a machine learning engine 830, personalized landing pages 832, and a randomized offers module 836. A plurality of engagement/offer types are illustrated in a table 838.

The real time analytics module 828 can be configured to perform real-time analytics on user behaviors including the collection and analysis of user preferences. In some embodiments, the real time analytics module 828 leverages the machine learning engine 830 to perform machine learning-based processing of user data in order to determine specific engagements that are tailored to the preferences of the user.

In some embodiments, the engagement service 804 evaluates the user interests and promotes the offers of the category that the user is most interested in. This is done with the data mining algorithms provided by the real time analytics module 828 and the machine learning engine 830.

In various embodiments, the machine learning engine 830 can use aggregated data from a plurality of users in order to model user behaviors and preferences in order to generate customized engagements. In some embodiments, customized engagements include personalized landing pages 832. That is, when a user responds to an engagement notice on their device, the user's communication device is redirected a personalized landing page 834 of the personalized landing pages 832 that has been created for the end user. In other embodiments, the engagement service 804 can serve randomized offers/engagements from the randomized offers module 836.

In some embodiments, engagements are created for different customer types such as members and non-members, or engagements can be personalized, or simply include notifications and/or general offers or information. In one embodiment, if a customer has registered their device or profile with the IOT backend system 800 the IOT backend system 800 can transmit a first offer or engagement to the communication device 810. This first offer is related to the user being a member and can include monetary offers. In another embodiment, if a customer has not previously registered their device or profile with the IOT backend system 800 the IOT backend system 800 can transmit a second type of offer or engagement to the communication device 810. This second type of offer is related to the user being a member and can include non-monetary offers.

Other example systems that can be configured for these example application-less messaging services include the embodiments disclosed and illustrated with respect to FIGS. 3 and 4. Using any of these embodiments a user can view the details of the offer and accept the offer without installing an application on their communication device 810. An engagement can be a promotional offer of any type (such as to sell merchandise or services), a giveaway, an offer for a discount, a coupon, an offer of money, a survey offer, a buy one get one free offer, and the like. The user may register with the IOT backend system 800 by providing their email identifier and/or phone number. Alternatively, the user also can register with the help of social login (such as a login through social media like Facebook™). Once the user interacts with the system the administrator can then reach out to the user no matter when and where the user is at the moment. That is, once the communication device 810 is within short-range wireless proximity to the IOT device 806, the communication device 810 receives a notification or other engagement in an application-less manner. Once the user has accepted this engagement the IOT backend system 800 can communicate with the user even when the user leaves short-range wireless proximity. The notification system implemented by the IOT backend system 800 allows an administrator to reach out to customers through emails, text messages and PUSH notifications, without any application installed on the end user's smart device. Communications through text and emails can be delivered regardless of the proximity of the short-range wireless of the communication device 810 with the IOT backend system 800 or more specifically the IOT device 806.

In some embodiments, the communication device 810 and IOT device 806 successfully connects over Bluetooth connection with using an acceptable handshake or a Bluetooth pairing. This process spawns a virtual session between the communication device 810 and IOT device 806 which is indicative of a server/client relationship. Next, a pop-up or PUSH notifications is presented on a web browser 814 of the communication device 810.

In some embodiments, inside the virtual session, there may be a URL which may be the notification itself. Thus, the IOT device 106 in this example may broadcast a short code with the offer. The IOT device 106 may for instance broadcast a URL that has the short code in it, and that short code spawns a notification presented on the web browser 814 of the communication device 810. The user receives the notification on their communication device 810 and the notification may include an offer. The user can redeem an offer online through the personalized landing page offer 832 or by redeeming the offer at a brick and mortar store. A notification, such as notification 816 can provide a timestamp, a title, description of the notification, and the like. A user can sometimes share a notification via social media. The IOT backend system 800 can provide tailored and unique notifications to the users.

As noted above, the offers being provided to the user may depend on whether the user is registered with the system. That is, an IOT device may send out two types of notifications. For example, an IOT device can provide a monetary offer to registered members, and the same IOT device can provide a points-only offer for non-registered members.

If a user rejects one or more offers from a category of offers, the system can learn from the user's past behavior and no longer provide any further offers from the category to the user. The proximity discovery algorithms will use categories to name the notification types that users will receive, such as dining, travel, sports, beauty supplies, city services, offers, and so forth. These categories will be used to pair the notifications with the user's preferences at the engagement service 804 level.

In one or more embodiments, the IOT device 806 (or any other suitable portion of the IOT backend system 800) can store a low-level protocol log file (such as the Bluetooth log file) that can comprise personal information for a user associated with a communication device 810, such as locations that the user visited. Thus, a user who walks by the IOT device 806 may receive multiple notifications. Once the user leaves the area serviced by the IOT device 806, then the user may still access the multiple notifications if the notifications are still stored in a temporary data file on the communication device 810. That is, the low-level protocol log file can persist or be stored on the communication device 810 in some embodiments.

If the user returns to a saved URL of a notification that link can tie to a fingerprint generated for the communication device 810 and the rule engine data that is associated with that user, such that their preferences are updated and displayed to include that saved notification. Aspects of fingerprinting and utilization of rule engine data are disclosed in detail supra.

In some embodiments, Bluetooth scanners may log all the data stored inside scanner applications that reside on the IOT device 806 so the IOT backend system 800 can store that user data in the cloud with a point of reference. User preferences can be matched with the notification presented to them. In some embodiments, the IOT backend system 800 can group notifications or notification links having offers in categories, such as utilities, dining, travel, traffic, sports, and the like.

In one example use case, if the user indicates in their preferences that they are interested in dining and sports categories only, the user may only receive dining and sports notifications based on their preset user preferences. Thus, the IOT backend system 800 can personalize a user's offers and present offers for which the user has opted-in. In some embodiments, the IOT backend system 800 can also push randomized notifications or offers. That is, a user who walks past a location having an IOT device may receive a message or notification is this engagement is a first time engagement between the IOT device 806 and the communication device 806, but the second time the communication device 806 engages with the IOT device 806 in the same location, the user may not receive that same message.

Notifications may be assigned by the IOT backend system 800 to a location or an item or service. Thus, a user who walks through a mall may pass through a proximity location with the engine 824, and those offers are set up to run at various time periods. The user may receive a static offer as he walks by the proximity location. The user may be matched to the offers that match with their preferences, and the offer may be presented during a particular time period. The offers that do not match with a user's preferences may not be presented to the user at all.

In further embodiments, the IOT backend system 800 can implement proximity discovery algorithms in order to pair the correct communication device to transmit the message. For example, the IOT device 806 may interrogate the communication device 810 to determine if a selected offer fits the user's profile or preset preferences. If the user indicates that he did not like tennis, for instance, he would not be presented with offers regarding tennis. Over time the machine learning engine 830 learns the user's behavior so that the user only receives personalized information or notifications for the categories that he subscribed.

In other embodiments, an emergency alert may be provided to a user using the systems and methods described herein. For instance, a police department may wish to alert the public that a particular beach will be closed after 10:00 pm for public safety reasons. If a user having a communication device 810 crosses a certain boundary where there is an IOT device such as IOT device 806, the user may receive an audible alert audible without having an application installed on the communication device 810. The technology can take advantage all of the features of the user's communication device 810, including video and audio capabilities. Returning to the example, the user may receive a notification in his native language that the beach is closed at 10:00 pm, and for the user's safety, the user is notified that he can return to the beach when it has reopened after 7:00 a.m. In this scenario, when the Bluetooth pairing occurs between the IOT device 806 and the communication device 810, a notification is sent to the user's communication device 810 with urgency. The Bluetooth protocol pairs allows the IOT device 806 to pair with a speaker of the communication device 810 and since the technology does not know if the user has a legacy or smart device, it will use the audio features of the communication device 810 to transmit the emergency alert notification.

In general, the IOT device 806 is configured to use kernel level services of the communication device 810 including any of fax, print, phone, video, audio, or communications features of the communication device 810. In some embodiments, the IOT device 806 can be configured to toggle between active user communication protocols to deliver notification message. This allows the IOT device 806 to serve a large number of communication devices that may utilize a wide range of application-less communication features that are defined by their specific operating system(s). That is the IOT device 806 can selectively modify its short-range wireless communication protocol stack based on a short-range wireless protocol that is active on the each of the communication devices. In sum, the embodiment disclosed in FIG. 8 includes a system that is capable of communicating with communication devices such as smartphones in an application-less manner. Generally, the system includes an Internet-of-things backend system comprising IOT devices that implement proximity and physical web discovery services and implement a modified short-range wireless communication protocol stack for communicating with communication devices at a kernel level.

In general, each of the communication devices receives messages from the Internet-of-things backend system over a short-range wireless connection. The messages are presented to the communication devices without an application being installed on the communication devices. In various embodiments the modified short-range wireless communication protocol stack used by IOT devices of the system are configured based on a short-range wireless protocol that is active on the each of the communication devices. That is, an IOT device can selectively configure its short-range wireless protocol stack based on the communicative capabilities of a given communication device. To be sure, in some embodiments at least a portion of the communication devices that are engaged with by an IOT device use a different short-range wireless protocol than one another. Thus, the ability of the IOT device to selectively configure its short-range wireless protocol stack allows the IOT device to communicate with a wide range of devices.

In some embodiments, the IOT device 102 can configure the protocol stack by identifying one or more communication protocols being used by the communication device. Once the one or more communication protocols are identified, the one or more communication protocols are replicated at the IOT device. Engagements such as notifications can then be transmitted to communication device. The engagements include a URL or file.

Figure 9:
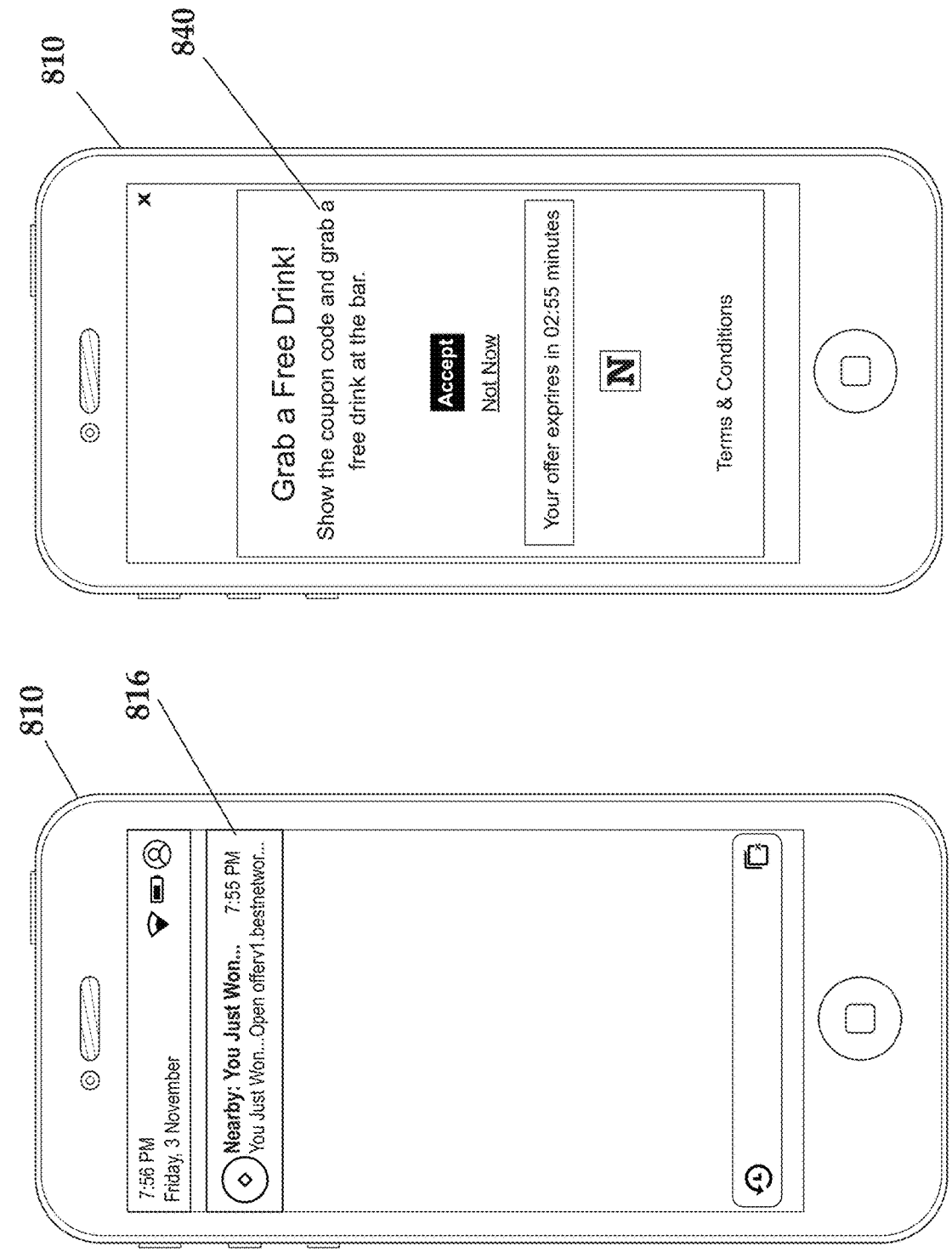
FIGS. 9A and 9B collectively illustrate the display of engagements such as notifications and customized offers to communication devices.

FIG. 9A illustrates an example notification 816 is presented on a communication device 810. FIG. 9B illustrates a personalized offer 840 presented on the communication device 810.

The foregoing descriptions regarding FIG. 8 (and in some instances in view of other embodiments disclosed above) provide systematic descriptions of an example architecture that can be used to practice aspects of the present disclosure. The following paragraphs describe example methodological embodiments that can be performed using any of the system (s) disclosed above.

Figure 10:
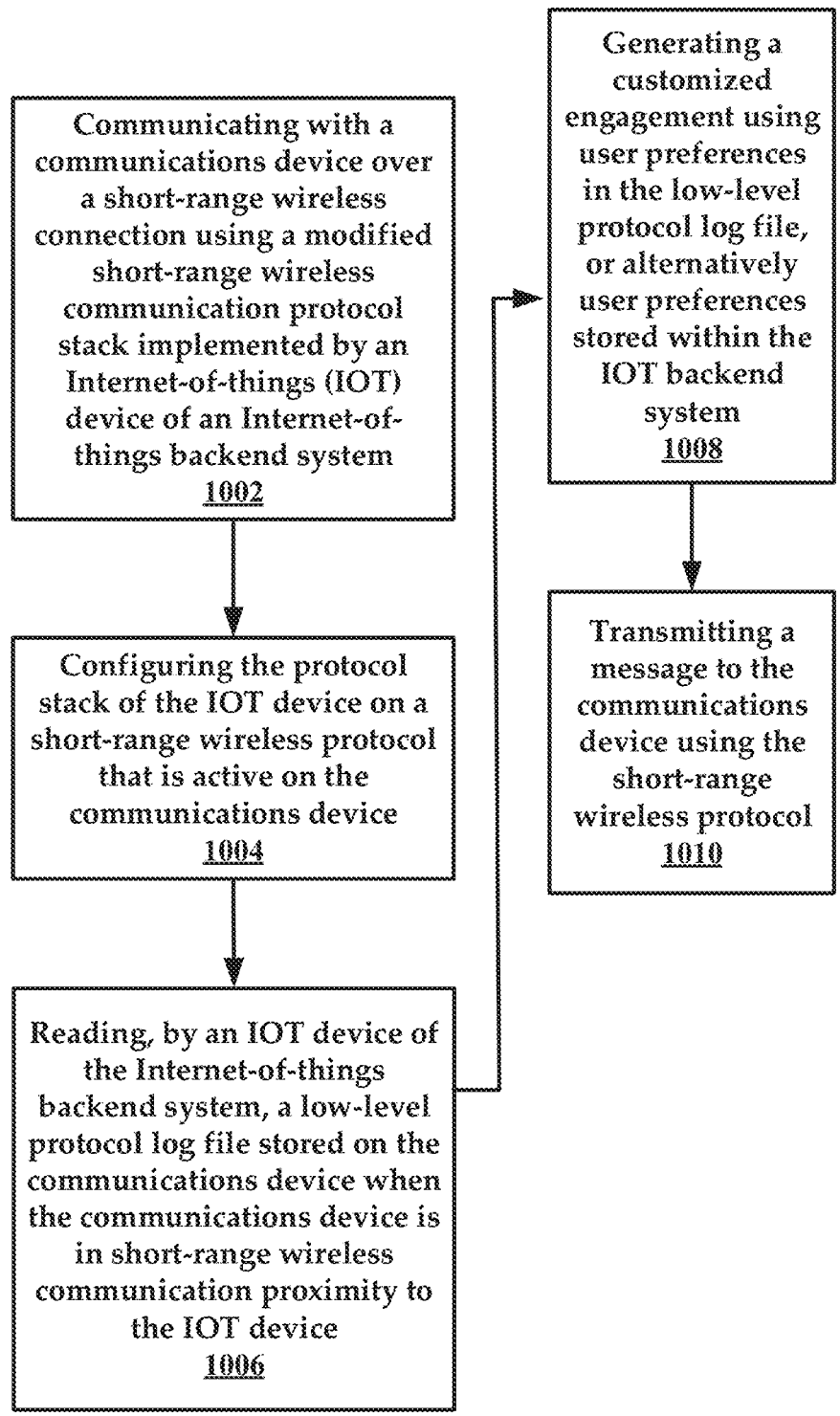
FIG. 10 is a flowchart of an example method of the present disclosure.

Referring now to FIG. 10, an example method of the present disclosure comprises a step 1002 of communicating with a communication device over a short-range wireless connection using a modified short-range wireless communication protocol stack implemented by an Internet-of-things (IOT) device of an Internet-of-things backend system. The IOT device can include any of the IOT devices disclosed herein. This step can be triggered when a communication device enters a broadcasting range of at least one of the IOT devices. A communicative connection can be established between the IOT device and the communication device using any of the established methods disclosed above, such as a Bluetooth handshake process.

Next, the method includes a step 1004 of configuring the protocol stack of the IOT device on a short-range wireless protocol that is active on the communication device. Again, this includes the IOT device selecting a communication protocol used by the communication device, but the IOT device is capable of selectively changing its protocol stack when a different communication device (which uses a different communication protocol or OS) enters short-range wireless range.

Next, the method includes a step 1006 of reading, by an IOT device of the Internet-of-things backend system, a low-level protocol log file stored on the communication device when the communication device is in short-range wireless communication proximity to the IOT device. This low-level protocol log file can include user preferences or other user or communication device data that is descriptive of the user or the communicative capabilities of the communication device.

The method can include a step 1008 of generating a customized engagement using user preferences in the low-level protocol log file, or alternatively user preferences stored within the IOT backend system.

The method can also include a step 1010 of transmitting a message to the communication device using the short-range wireless protocol. To be sure, the message can be displayed on the communication device without an application being installed on the communication device. In various embodiments, the message has content that is based on the low-level protocol log file (e.g., tailored to the preferences of the user).

As noted above, the IOT device can push offers to the communication device over the short-range wireless connection using the modified short-range wireless communication protocol stack in such a way that the communication device does not require an application to receive or display the offers.

Figure 11:
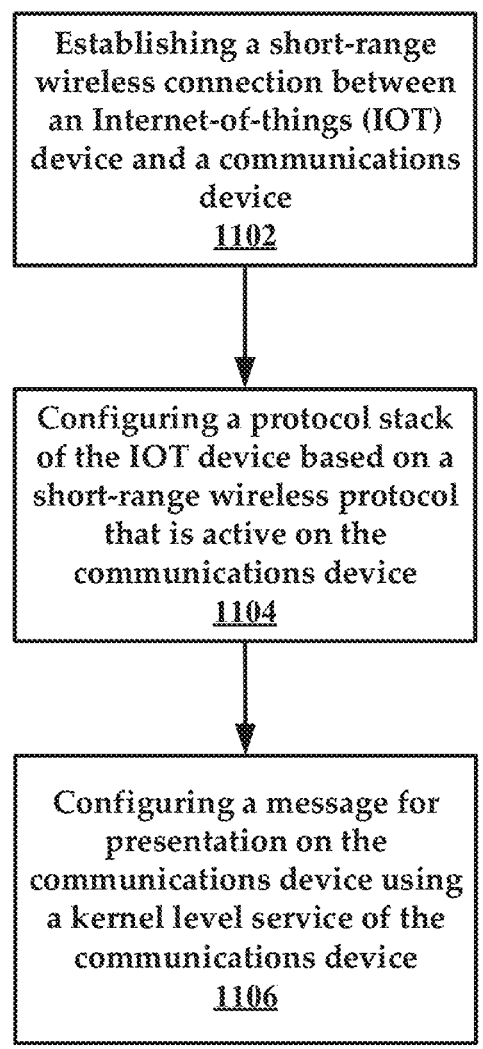
FIG. 11 is a flowchart of another example method of the present disclosure.

FIG. 11 is a flowchart of another example method of the present disclosure. In some embodiments, the method includes a step 1102 of establishing a short-range wireless connection between an Internet-of-things (IOT) device and a communication device. Example method for establishing a short-range wireless connection between an Internet-of-things (IOT) device and a communication device are disclosed above.

Next, the method includes a step 1104 of configuring a protocol stack of the IOT device based on a short-range wireless protocol that is active on the communication device. That is, the IOT device determines the protocol used by the communication device and then selectively adjusts its protocol stack in accordance.

In some embodiments, the method includes a step 1106 of configuring, by the IOT device, a message for presentation on the communication device using a kernel level service of the communication device. The kernel level service allows for notifications to be presented using a communication device that is not a smart device. Examples above included causing a microphone of the communication device to output a tone.

Figure 12:
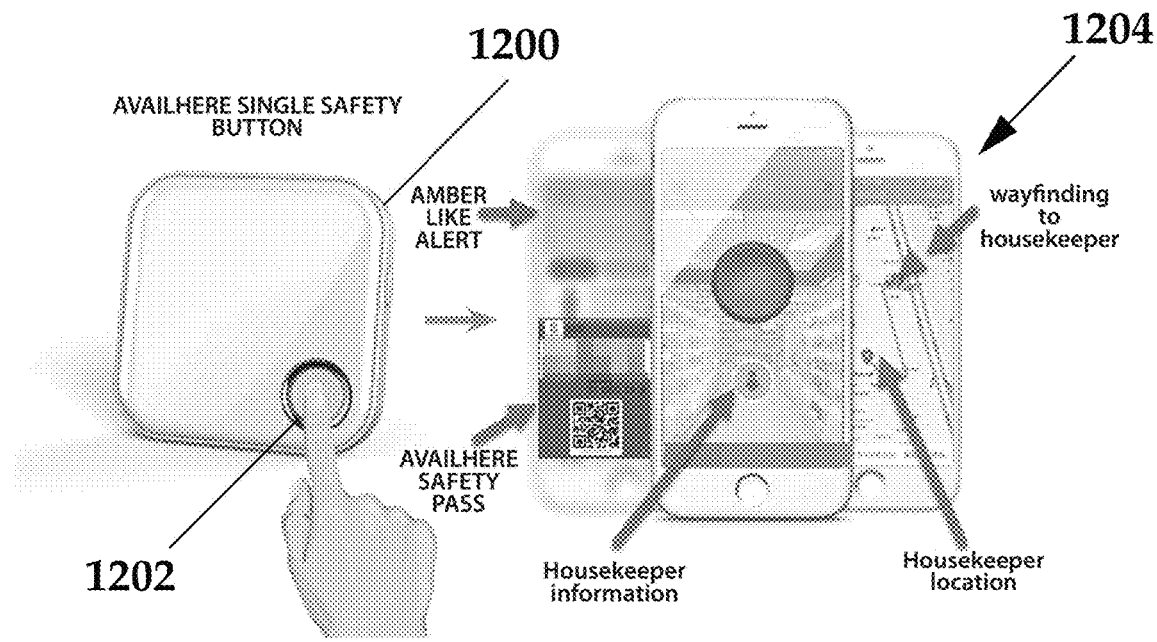
FIG. 12 illustrates an example embodiment of a local safety alert process and system of the present disclosure.

FIG. 12 illustrates another example embodiment of an IOT device 1200 that can be used by an end user like their communication device or smartphone. The IOT device 1200 is not an IOT device not a constituent part of an IOT backend system, but is a specific type of UE that includes a safety button 1202 that allows for single button safety communications. The IOT device 1200 can comprise a processor and memory that store instructions, as well as communicative capabilities such as a short-range wireless communications module. The processor of the IOT device 1200 can PUSH or broadcast a native notification message in response to a push of the safety button 1202. In some embodiments, the IOT device 1200 uses a WiFi browser module that communicates with other similarly enabled IOT devices 1204. Communications between these UEs can occur using WiFi, Bluetooth, or other similar protocols.

In some embodiments, the safety button 1202 of the IOT device 1200 implements a WiFi browser module which sends a URL (e.g., notification) to one or more end point UEs.

Each of these IOT devices stores and implements a safety pass. IOT devices receive a PUSH native lock screen notification. When the safety button is depressed a native alert notification is transmitted to endpoint devices having a designated wallet safety pass. This allows for a one to many PUSH of a message to designated end point UEs. The UE native notification specifies activated safety button location (location of the IOT device 1200). In some embodiments the messages include navigation information for use in a navigation program on the UE. Correspondingly, the message can include geo-fence data such as in/out and duration time within each geo-fence location for the IOT device 1200. In some embodiments, two-way communication can be enabled between IOT devices such as push-to-talk or direct messaging.

Figure 13:
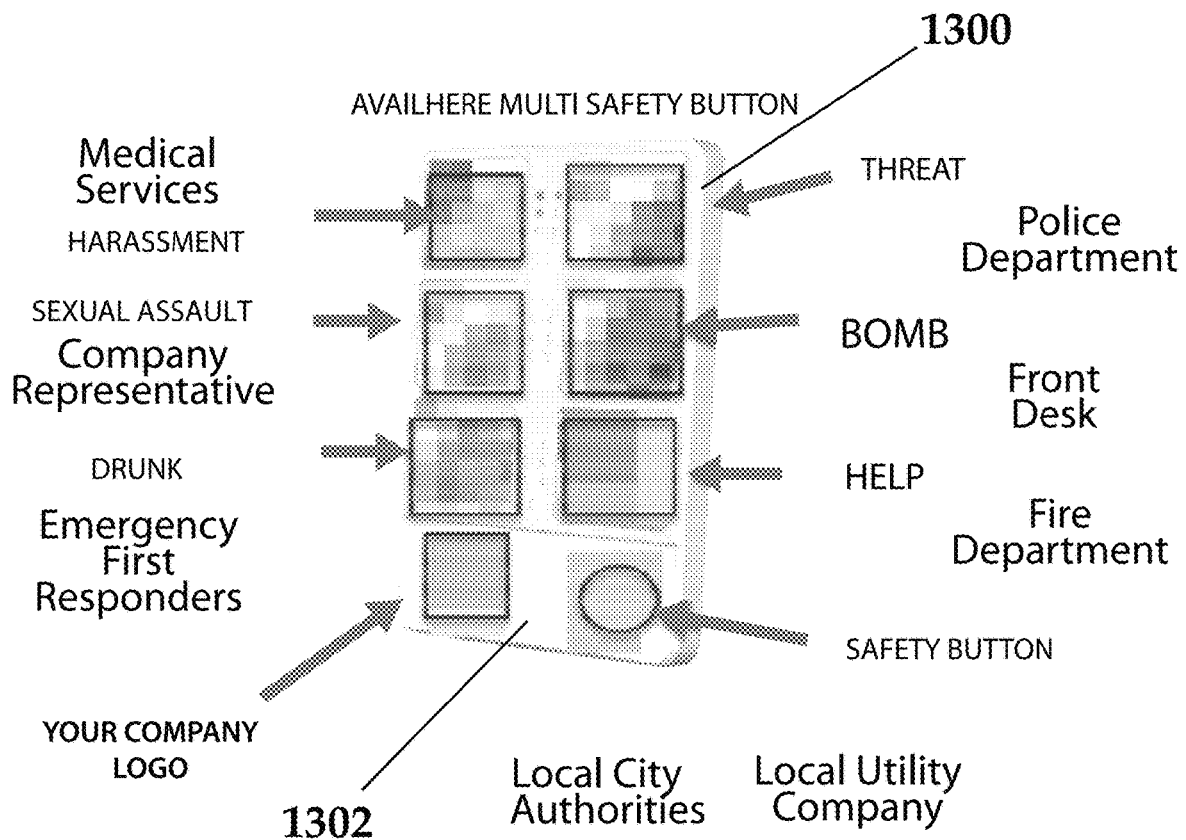
FIG. 13 illustrates another example embodiment of a local safety alert process and system of the present disclosure implementing a multi-button device.

FIG. 13 illustrates another example embodiment of an IOT device 1300 that implements a multiple button safety button interface 1302. In one embodiment, each of the buttons on the multiple button safety button interface 1302 can include physical and/or virtual buttons. Each of the buttons can be assigned a different condition. For example, buttons can be associated with a threat which triggers police dispatch. Another button indicates a bomb threat which likewise triggers police dispatch. Yet another embodiment indicates a general request for help which could trigger communications with customer service or a front desk (such as in a hotel or office building). An additional button is a general safety button which may trigger dispatch of the fire department. Local or city authorities, including utilities can be triggered using another button, whereas another button may trigger dispatch of emergency first responders such as paramedics. Other buttons can be assigned to more specific events and cause a resulting trigger of a service.

As with other embodiments, the IOT device 1300 includes a UE that is configured to push native notifications using a browser module via WiFi to another endpoint UE device that is similarly configured to the IOT device 1300. In some embodiments, the IOT device 1300 can comprise a processor and memory that store instructions, as well as communicative capabilities such as a short-range wireless communications module. The processor of the IOT device 1300 can PUSH or broadcast a native notification message in response to a push of any button on the multiple button safety button interface 1302. In some embodiments, the IOT device 1300 uses a WiFi browser module that communicates with other similarly enabled IOT devices. Communications between these UEs can occur using WiFi, Bluetooth, or other similar protocols. Each of these IOT devices stores and implements a safety pass.

Safety button results in pushing of native selected alert notifications to one or more endpoint UEs with designated wallet passes. As noted above, this enables one to many communication between UE endpoints. Each of the multiple safety buttons can specify an alert type, alert location, provides navigation, and geofence data indicates in/out and duration time of a UE within each geofence location. As with the embodiment of FIG. 12, some embodiments allow for includes two-way real-time engagement and communication between configured IOT devices (e.g., UEs), and endpoint UEs can group real-time communicate via kernel level services. Notably, the embodiments of FIGS. 12 and 13 can be combined with any other embodiment described herein.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus.

Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for application-less communication, the system comprising:
    an Internet-of-things backend system comprising IOT devices that implement proximity and physical web discovery services and implement a modified short-range wireless communication protocol stack for communicating with communication devices at a kernel level, wherein the communication devices use a notification access process that involves a template store, and the communication devices further retrieve notification log file process and access kernel services with a token or an authentication key; and each of the communication devices receiving messages from the Internet-of-things backend system over a short-range wireless connection, the messages being presented to the communication devices without an application being installed on the communication devices, the modified short-range wireless communication protocol stack being configured based on a short-range wireless protocol that is active on the each of the communication devices.

2. The system according to claim 1, wherein the short-range wireless connection is created when a communication device is in short-range proximity to at least a portion of the Internet-of-things backend system.

3. The system according to claim 1, wherein at least a portion of the communication devices use a different short-range wireless protocol than one another.

4. The system according to claim 1, wherein the proximity and physical web discovery services implement an open systems interconnect reference model stack.

5. The system according to claim 4, wherein the Internet-of-things backend system communicates with the proximity and physical web discovery services at a kernel level.

6. The system according to claim 5, wherein the Internet-of-things backend system is further configured to interact with kernel level services of a communication device including any of fax, print, phone, video, audio, or communications features of the communication device.

7. The system according to claim 1, wherein the Internet-of-things backend system is further configured to push offers to a communication device over the short-range wireless connection by the Internet-of-things backend system using the modified short-range wireless communication protocol stack in such a way that the communication device does not require an application to receive or display the offers.

8. The system according to claim 1, wherein the Internet-of-things backend system is further configured to:
identify a presence of a communication device of the communication devices when the communication device is proximate an IOT device of the Internet-of-things backend system;
identify one or more communication protocols being used by the communication device;
replicate the one or more communication protocols at the IOT device; and
push a notification to the communication device that comprises a URL or file.

9. The system according to claim 8, wherein the Internet-of-things backend system is further configured to deliver a first offer to the communication device if the communication device is registered with the Internet-of-things backend system, otherwise deliver a second offer to the communication device if the communication device is not registered with the Internet-of-things backend system.

10. The system according to claim 9, wherein the Internet-of-things backend system is further configured to store a low level protocol log file that comprises personal information for a user of the communication device and locations that the communication device has visited.

11. The system according to claim 10, wherein the communication device is configured to store one or more notifications provided by the Internet-of-things backend system in temporary storage for later retrieval.

12. The system according to claim 11, wherein the one or more notifications are linked to a fingerprint of the communication device.

13. The system according to claim 1, wherein the Internet-of-things backend system comprises IOT devices that comprise short-range wireless scanners that log short-range wireless interactions with the communication devices.

14. The system according to claim 1, wherein the messages comprise at least one of a public safety alert and an emergency alert.

15. A method, comprising:
communicating with a communication device over a short-range wireless connection using a modified short-range wireless communication protocol stack implemented by an Internet-of-things (IOT) device of an Internet-of-things backend system;
configuring the protocol stack based on a short-range wireless protocol that is active on the communication device;
reading, by an IOT device of the Internet-of-things backend system, a low-level protocol log file stored on the communication device when the communication device is in short-range wireless communication proximity to the IOT device; and
transmitting a message to the communication device using the short-range wireless protocol, wherein the message can be displayed on the communication device without an application being installed on the communication device, wherein the message has content that is based on the low-level protocol log file, the communication device using a notification access process that involves a template store, and the communication device further retrieves notification log file process and access kernel services with a token or an authentication key.

16. The method according to claim 15, wherein the Internet-of-things backend system comprises proximity and physical web discovery services that communicate with the communication device, wherein the proximity and physical web discovery services implement an open systems interconnect reference model stack.

17. The method according to claim 16, further comprising the IOT device communicating with the proximity and physical web discovery services at a kernel level.

18. The method according to claim 17, further comprising the IOT device interacting with kernel level services of the communication device including any of fax, print, phone, video, audio, or communications features of the communication device.

19. The method according to claim 17, wherein the IOT device is further configured to push offers to the communication device over the short-range wireless connection using the modified short-range wireless communication protocol stack in such a way that the communication device does not require an application to receive or display the offers.

20. The method according to claim 15, wherein configuring the protocol stack based on a short-range wireless protocol that is active on the communication device comprises:
identifying one or more communication protocols being used by the communication device;
replicating the one or more communication protocols at the IOT device; and
pushing a notification to the communication device that comprises a URL or file.

21. The method according to claim 15, wherein the message comprises at least one of a public safety alert and an emergency alert.

22. A method, comprising:
establishing a short-range wireless connection between an Internet-of-things (IOT) device and a communication device;

configuring a protocol stack of the IOT device based on a short-range wireless protocol that is active on the communication device; and configuring a message for presentation on the communication device, wherein the message is presented using a kernel level service of the communication device, and wherein the communication device uses a notification access process that involves a template store, and the communication device further retrieves notification log file process and access kernel services with a token or an authentication key.

23. The method according to claim 22, wherein the message comprises at least one of a public safety alert and an emergency alert.

24. A system for application-less communication, the system comprising:
an Internet-of-things backend system comprising:
IOT devices that:
implement proximity and physical web discovery services; and
implement a modified short-range wireless communication protocol stack for communicating with communication devices and delivering notifications;
each of the communication devices being configured to: implement a passport or wallet for receiving the notifications from the Internet-of-things backend system over a short-range wireless connection, the notifications being presented to the communication devices without an application being installed on the communication devices, the communication devices using a notification access process that involves a template store, the communication devices further retrieving notification log file process and access kernel services with a token or an authentication key, each of the communication devices being further configured to:
receive an indication that a button on a communication device has been activated;
generate a message based on the button activation; and
transmit the message to one or more additional communication devices through the IOT devices of the Internet-of-things backend system, the one or more additional communication devices being similarly configured with the passport or wallet.

25. The system according to claim 24, wherein the short-range wireless connection is created when at least a portion of the communication devices are in short-range proximity to at least a portion of the Internet-of-things backend system.

26. The system according to claim 24, wherein at least a portion of the communication devices use a different short-range wireless protocol than one another.

27. The system according to claim 24, wherein the proximity and physical web discovery services implement an open systems interconnect reference model stack.

28. The system according to claim 27, wherein the Internet-of-things backend system communicates with the proximity and physical web discovery services at a kernel level.

29. The system according to claim 28, wherein the Internet-of-things backend system is further configured to interact with kernel level services of at least a portion of the communication devices including any of fax, print, phone, video, audio, or communications features of the at least a portion of communication devices.

30. The system according to claim 24, wherein the Internet-of-things backend system is further configured to push offers to at least a portion of the communication devices over the short-range wireless connection by the Internet-of-things backend system using the modified short-range wireless communication protocol stack in such a way that the at least a portion of the communication devices does not require an application to receive or display the offers.

31. The system according to claim 24, wherein the communication devices are configured to store the notifications provided by the Internet-of-things backend system in temporary storage for later retrieval.

32. The system according to claim 31, wherein the notifications are linked to a fingerprint of the communication devices.

33. The system according to claim 24, wherein the Internet-of-things backend system comprises IOT devices that comprise short-range wireless scanners that log short-range wireless interactions with the communication devices.

34. The system according to claim 24, wherein the message comprises at least one of a public safety alert and an emergency alert.

* * * * *